United States Patent
Nishijima et al.

(10) Patent No.: US 11,043,717 B2
(45) Date of Patent: Jun. 22, 2021

(54) NON-AQUEOUS ELECTROLYTE SECONDARY BATTERY

(71) Applicant: Envision AESC Japan Ltd., Zama (JP)

(72) Inventors: Manabu Nishijima, Kanagawa (JP); Fumihiro Kawamura, Kanagawa (JP); Yuji Muroya, Kanagawa (JP); Yoshiaki Nitta, Kanagawa (JP)

(73) Assignee: Envision AESC Japan Ltd., Zama (JP)

( * ) Notice: Subject to any disclaimer, the term of this patent is extended or adjusted under 35 U.S.C. 154(b) by 179 days.

(21) Appl. No.: 16/308,073

(22) PCT Filed: Jun. 8, 2016

(86) PCT No.: PCT/JP2016/067137
§ 371 (c)(1),
(2) Date: Feb. 22, 2019

(87) PCT Pub. No.: WO2017/212595
PCT Pub. Date: Dec. 14, 2017

(65) Prior Publication Data
US 2019/0259999 A1 Aug. 22, 2019

(51) Int. Cl.
*H01M 4/131* (2010.01)
*H01M 4/505* (2010.01)
(Continued)

(52) U.S. Cl.
CPC .............. *H01M 50/40* (2021.01); *B32B 27/32* (2013.01); *H01M 4/131* (2013.01); *H01M 4/133* (2013.01);
(Continued)

(58) Field of Classification Search
None
See application file for complete search history.

(56) References Cited

U.S. PATENT DOCUMENTS

| 2006/0204855 A1* | 9/2006 | Saruwatari | H01M 10/0568 429/324 |
| 2014/0361457 A1 | 12/2014 | Nogata | |

(Continued)

FOREIGN PATENT DOCUMENTS

| CN | 1835272 A | 9/2006 |
| CN | 105103364 A | 11/2015 |

(Continued)

OTHER PUBLICATIONS

Office Action from corresponding application KR 10-2018-7035515; dated May 21, 2020; 9 pages (with translation).

*Primary Examiner* — Robert S Carrico
(74) *Attorney, Agent, or Firm* — Young Basile Hanlon & MacFarlane, P.C.

(57) ABSTRACT

A non-aqueous electrolyte secondary battery with improved cycle durability includes a power generating element including a positive electrode obtained by forming a positive electrode active material layer containing a positive electrode active material on a surface of a positive electrode current collector, a negative electrode obtained by forming a negative electrode active material layer containing a negative electrode active material on a surface of a negative electrode current collector, and a separator, a ratio of a rated capacity to a pore volume of the separator being 1.55 Ah/cc or more, a ratio of a battery area to a rated capacity being 4.0 $cm^2$/Ah or more, and a rated capacity being 30 Ah or more, wherein a variation in porosity in the separator is 4.0% or less.

5 Claims, 3 Drawing Sheets

(51) Int. Cl.
*H01M 4/525* (2010.01)
*H01M 10/0525* (2010.01)
*H01M 4/133* (2010.01)
*B32B 27/32* (2006.01)
*H01M 50/116* (2021.01)
*H01M 50/411* (2021.01)
*H01M 50/449* (2021.01)
*H01M 10/052* (2010.01)
*H01M 50/40* (2021.01)
*H01M 10/058* (2010.01)
*H01M 50/403* (2021.01)
*H01M 50/463* (2021.01)
*H01M 4/02* (2006.01)
*H01M 10/42* (2006.01)

(52) U.S. Cl.
CPC ........... *H01M 4/505* (2013.01); *H01M 4/525* (2013.01); *H01M 10/058* (2013.01); *H01M 10/0525* (2013.01); *H01M 50/116* (2021.01); *H01M 50/403* (2021.01); *H01M 50/411* (2021.01); *H01M 50/449* (2021.01); *H01M 50/463* (2021.01); *H01M 10/052* (2013.01); *H01M 2004/028* (2013.01); *H01M 2010/4292* (2013.01); *H01M 2220/30* (2013.01)

(56) References Cited

U.S. PATENT DOCUMENTS

| | | |
|---|---|---|
| 2014/0363738 A1 | 12/2014 | Blanc et al. |
| 2015/0221916 A1 | 8/2015 | Lee et al. |
| 2016/0064715 A1 | 3/2016 | Honda et al. |
| 2017/0162850 A1 | 6/2017 | Murakami et al. |

FOREIGN PATENT DOCUMENTS

| | | | |
|---|---|---|---|
| CN | 105580160 A | 5/2016 | |
| JP | H0820660 A | 1/1996 | |
| JP | H08020659 A | 1/1996 | |
| JP | 4628764 B2 | 2/2011 | |
| JP | 2013142101 A | 7/2013 | |
| JP | 2014532979 A | 12/2014 | |
| JP | 2015008124 A | 1/2015 | |
| KR | 10-2014-0085337 A | 7/2014 | |
| KR | 10-2015-0123897 A | 11/2015 | |
| WO | WO-2014157421 A1 * | 10/2014 | .......... H01M 2/1673 |
| WO | 2016031493 A1 | 3/2016 | |

* cited by examiner

NON-AQUEOUS ELECTROLYTE SECONDARY BATTERY

TECHNICAL FIELD

The present invention relates to a non-aqueous electrolyte secondary battery.

BACKGROUND

Currently, a non-aqueous electrolyte secondary battery including a lithium ion secondary battery that is utilized for a mobile device such as a mobile phone is available as a commercial product. The non-aqueous electrolyte secondary battery generally has a configuration in which a positive electrode having a positive electrode active material or the like applied to a current collector and a negative electrode having a negative electrode active material or the like applied to a current collector are connected to each other via an electrolyte layer in which a non-aqueous electrolyte solution or a non-aqueous electrolyte gel is held in a separator. Further, charge and discharge reactions of a battery occur as ions such as lithium ions are absorbed into and desorbed from an electrode active material.

Incidentally, in recent years, it has been desired to reduce the amount of carbon dioxide in order to cope with global warming. Hence, a non-aqueous electrolyte secondary battery having a small environmental burden has been used not only in a mobile device or the like but also in a power source device of an electrically driven vehicle such as a hybrid vehicle (HEV), an electric vehicle (EV), or a fuel cell vehicle.

A non-aqueous electrolyte secondary battery directed to the application to electrically driven vehicles is desired to have a high output and a high capacity. Further, the non-aqueous electrolyte secondary battery directed to the application to electrically driven vehicles is desired to have cycle characteristics that the capacity can be maintained even when the charge and discharge cycle is repeated for a long period of time.

Herein, a large number of proposals on a separator used in a non-aqueous electrolyte secondary battery such as a lithium ion secondary battery have hitherto been made. For example, JP 8-20659 A and JP 8-20660 A disclose a technique of obtaining a microporous membrane having a uniform and microporous structure by stretching a film containing a low-molecular-weight material of the same system as that of a crystalline base polymer such as polyethylene at a low temperature approximately near room temperature and then stretching the film uniaxially under heating. In addition, JP 4628764 B2 discloses a technique relating to a separator which is formed of cellulose fibers having a maximum fiber thickness of 1000 nm or less and has an air permeability of 5 sec/100 cc or more and 700 sec/100 cc or less, in which an electrical resistance value is set to 1.0 $\Omega\text{cm}^2$ or less, and a thickness (5 to 50 μm), porosity (60 to 90%), and a maximum pore diameter (0.03 to 0.25 μm) of the separator and a non-uniformity parameter H (0.15 or less) of the separator are controlled.

SUMMARY

A higher capacity is demanded in a non-aqueous electrolyte secondary battery to be mounted in an electrically driven vehicle. In addition, in consideration of use application of mounting the battery in the electrically driven vehicle, it is assumed that charging and discharging are repeated in a short time at a large current, and thus high lithium ion conductivity is demanded in the inside of the cell. Here, according to studies of the present inventors, the present inventors have found that, in a case where a conventionally known separator is simply applied to a non-aqueous electrolyte secondary battery having a capacity and a size which are assumed to increase the capacity, sufficient cycle durability is not obtainable in some cases.

In this regard, an object of the present invention is to provide a means capable of improving battery cycle durability in a non-aqueous electrolyte secondary battery having a capacity and a size which are assumed to increase the capacity.

The present inventors have conducted intensive studies in order to solve the above-described problem. As a result, the present inventors have found that the above-described problem can be solved by controlling a variation in porosity in a separator to a predetermined value or less in a non-aqueous electrolyte secondary battery having a capacity and a size which are assumed to increase the capacity, thereby completing the present invention.

That is, according to an aspect of the present invention, there is provided a non-aqueous electrolyte secondary battery including a power generating element including a positive electrode obtained by forming a positive electrode active material layer containing a positive electrode active material on a surface of a positive electrode current collector, a negative electrode obtained by forming a negative electrode active material layer containing a negative electrode active material on a surface of a negative electrode current collector, and a separator, a ratio of a rated capacity to a pore volume of the separator being 1.55 Ah/cc or more, a ratio of a battery area to rated capacity being 4.0 $\text{cm}^2/\text{Ah}$ or more, and a rated capacity being 30 Ah or more, wherein a variation in porosity in the separator is 4.0% or less.

DETAILED DESCRIPTION

Figure 1:
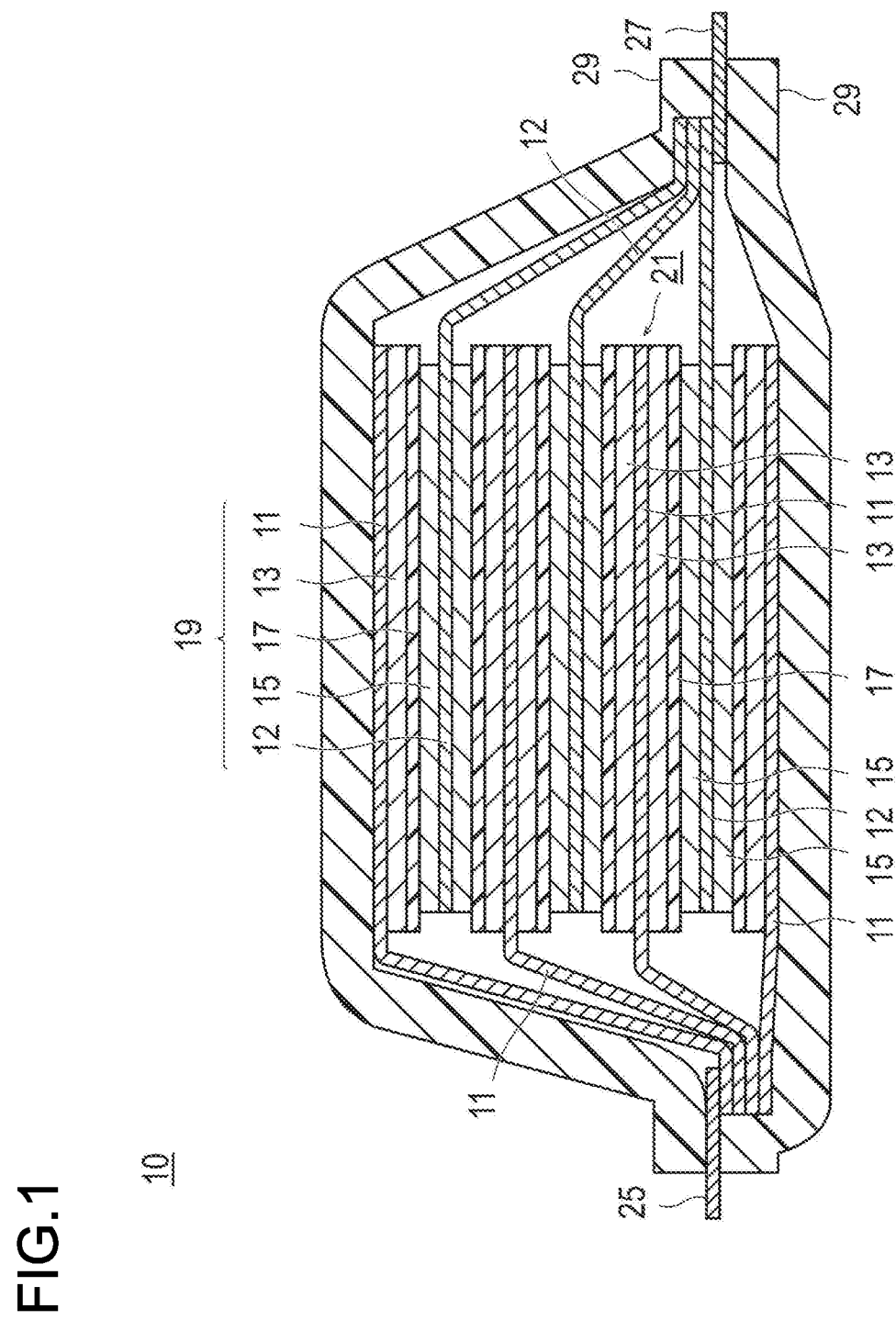
FIG. 1 is a schematic cross-sectional view illustrating a basic configuration of a flat type (laminate type) non-aqueous electrolyte lithium ion secondary battery, which is not a bipolar type, as an embodiment of a non-aqueous electrolyte secondary battery.

According to an aspect of the present invention, there is provided a non-aqueous electrolyte secondary battery which includes a power generating element including a positive electrode obtained by forming a positive electrode active material layer containing a positive electrode active material on a surface of a positive electrode current collector, a negative electrode obtained by forming a negative electrode active material layer containing a negative electrode active material on a surface of a negative electrode current collector, and a separator, a ratio of a rated capacity to a pore volume of the separator being 1.55 Ah/cc or more, a ratio of a battery area to a rated capacity being 4.0 cm$^2$/Ah or more, and a rated capacity being 30 Ah or more, in which a variation in porosity in the separator is 4.0% or less. According to the non-aqueous electrolyte secondary battery of the present invention, uniformity of lithium ion conductivity in the separator is improved, and occurrence of local electro-current constriction to a portion having a large overcharge and various problems caused thereby can be suppressed. As a result, it is possible to improve cycle durability in a non-aqueous electrolyte secondary battery having a capacity and a size which are assumed to increase the capacity.

So far, in an electrically driven vehicle, as compared to a gasoline vehicle, a distance that the electrically driven vehicle can travel per one charge (cruising distance) is shorter, and thus for wide use of the electrically driven vehicle, it is desired to extend the cruising distance of the electrically driven vehicle. In order to achieve a long cruising distance, it is necessary to increase a capacity of a battery to be mounted in the electrically driven vehicle. Further, as a means for achieving an increase in capacity of the battery, there is mentioned means for increasing an area (size) of the battery, increasing a capacity of an active material contained in the active material layer, increasing a density of the active material in the active material layer, or the like.

The present inventors have conducted studies on a non-aqueous electrolyte secondary battery in which a ratio of a rated capacity to a pore volume of a separator is 1.55 Ah/cc or more, a ratio of a battery area to a rated capacity is 4.0 cm$^2$/Ah or more, and a rated capacity is 30 Ah or more, as the non-aqueous electrolyte secondary battery having a capacity and a size which are assumed to increase the capacity. In the course of the studies, the present inventors have found that, in a case where a conventionally known separator is simply applied, sufficient cycle durability is not obtainable in some cases. In this regard, the present inventors have found that, by controlling a variation in porosity of the separator to a predetermined value or less, high cycle durability can be realized, thereby completing the present invention.

The detailed mechanisms for the effect being exhibited are not clear, but are speculated as follows. Incidentally, the technical scope of the present invention is not limited to the following mechanisms.

In a non-aqueous electrolyte secondary battery having a capacity and a size for realizing an increase in capacity, pressure distribution occurs in the plane, and non-uniform overvoltage distribution occurs also in the plane of the separator due to such pressure distribution. A separator constituting a battery, such as a battery to be mounted in an electrically driven vehicle, in which charging and discharging need to be repeatedly performed in a short time at a large current requires high lithium ion conductivity. However, when the non-uniform overvoltage distribution as described above occurs, currents are constricted at a local part having a large overvoltage (for example, a part having a high air permeability or a part having a small pore volume of the separator per area), and thus various problems such as decomposition of an electrolyte solution at the time of charging, SEI coating film generation on a surface of the negative electrode, and cracks of the positive electrode active material at the time of discharging may occur. These problems all cause a degradation in cycle durability of the battery.

In this regard, by setting the variation in porosity in the separator to 4.0% or less as described above, occurrence of electro-current constriction caused by non-uniform overvoltage distribution in the plane of the separator and various problems caused thereby can be suppressed. As a result, it is considered that this contributes to an improvement in cycle durability of the battery.

Hereinafter, embodiments of the present invention will be described with reference to the accompanying drawings. Incidentally, the same elements are given with the same symbols for the descriptions of the drawings, and overlapped descriptions are omitted. Further, dimensional ratios in the drawings are exaggerated for the sake of description, and are different from actual ratios in some cases.

[Non-Aqueous Electrolyte Secondary Battery]

FIG. 1 is a schematic cross-sectional view schematically illustrating the overview of a laminate type battery as an embodiment of a battery of the present invention. Incidentally, in the present specification, detailed description will be given using a lithium ion secondary battery, which is a flat type (laminate type) but not a bipolar type, illustrated in FIG. 1 as an example, but the technical scope of the present invention is not limited only to such an embodiment.

First, the overall structure of the non-aqueous electrolyte secondary battery of the present invention will be described using the drawings.

[Overall Structure of Battery]

FIG. 1 is a schematic cross-sectional view schematically illustrating the basic configuration of a flat type (laminate type) non-aqueous electrolyte lithium ion secondary battery which is not a bipolar type (hereinafter, also simply referred to as a "laminate type battery"). As illustrated in FIG. 1, a laminate type battery 10 of this embodiment has a structure in which a power generating element 21 with a substantially rectangular shape, in which charge and discharge reactions actually proceed, is sealed in a battery outer casing material 29 as a battery outer casing body. Herein, the power generating element 21 has a configuration in which a positive electrode, a separator 17, and a negative electrode are laminated. Incidentally, the separator 17 has a non-aqueous electrolyte (for example, liquid electrolyte) therein. The positive electrode has a structure in which a positive electrode active material layer 15 is disposed on both surfaces of a positive electrode current collector 12. The negative electrode has a structure in which a negative electrode active material layer 13 is disposed on both surfaces of a negative electrode current collector 11. Specifically, the negative electrode, the electrolyte layer, and the positive electrode are laminated in this order such that one positive electrode active material layer 15 and the negative electrode active material layer 13 adjacent thereto face each other via the separator 17. According to this, the adjacent positive electrode, electrolyte layer, and negative electrode constitute one single battery layer 19. Therefore, it can also be said that the laminate type battery 10 illustrated in FIG. 1 has a configuration in which a plurality of the single battery layers 19 are laminated to be electrically connected in parallel.

Incidentally, the negative electrode active material layer 13 is disposed only on one surface of both the outermost layer negative electrode current collectors positioned on both outermost layers of the power generating element 21. However, an active material layer may be formed on both surfaces thereof. That is, not a current collector exclusive for an outermost layer in which an active material layer is formed on only one surface is used but a current collector having an active material layer on both surfaces may be directly used as the current collector of the outermost layer. Further, a positive electrode active material layer may be disposed on one surface of the outermost layer positive electrode current collector by reversing the disposition of the positive electrode and negative electrode in FIG. 1 so that the outermost layer positive electrode current collector is disposed on both the outermost layers of the power generating element 21.

The positive electrode current collector 12 and the negative electrode current collector 11 have a structure in which a positive electrode current collecting plate (tab) 27 and a negative electrode current collecting plate (tab) 25, which conductively communicate with each electrode (positive electrode and negative electrode), are attached to the positive electrode current collector 12 and the negative electrode current collector 11 and led to the outside of the battery outer casing material 29 so as to be inserted between the end parts of the battery outer casing material 29. If necessary, each of the positive electrode current collecting plate 27 and the negative electrode current collecting plate 25 may be attached to the positive electrode current collector 12 and the negative electrode current collector 11 of each electrode via a positive electrode lead and a negative electrode lead (not illustrated) by ultrasonic welding, resistance welding, or the like.

Incidentally, although a laminate type battery, which is a flat type (laminate type) but not a bipolar type, is illustrated in FIG. 1, it may be a bipolar type battery including a bipolar type electrode which has a positive electrode active material layer electrically bound to one surface of a current collector and a negative electrode active material layer electrically bound to the opposite surface of the current collector. In this case, one current collector plays roles of both the positive electrode current collector and the negative electrode current collector.

Hereinafter, respective members constituting the non-aqueous electrolyte lithium ion secondary battery according to an aspect of the present invention will be described.

[Positive Electrode]

The positive electrode includes a positive electrode current collector and a positive electrode active material layer containing a positive electrode active material formed on the surface of the positive electrode current collector.

(Positive Electrode Current Collector)

The material constituting the positive electrode current collector is not particularly limited, but a metal is suitably used. Specific examples of the metal include aluminum, nickel, iron, stainless steel, titanium, and an alloy. In addition to these, a clad material of nickel and aluminum, a clad material of copper and aluminum, a plating material of a combination of these metals, or the like can be preferably used. Further, the material may be a foil obtained by coating a metal surface with aluminum. Among them, from the viewpoint of the electron conductivity and the potential for operating the battery, aluminum, stainless steel, and copper are preferable.

The size of the current collector is determined depending on the use of application of the battery. A current collector having a large area is used, for example, when the current collector is used in a large-sized battery which requires a high energy density. The thickness of the current collector is not particularly limited as well. The thickness of the current collector is generally about 1 to 100 μm.

Further, in the negative electrode described later, also in the case of using the negative electrode current collector, the same materials as described above can be used.

(Positive Electrode Active Material Layer)

The positive electrode active material layer 15 contains a positive electrode active material, and if necessary, further contains other additives such as a conductive aid, a binder, an electrolyte salt (lithium salt) as an electrolyte, and an ion conductive polymer.

(Positive Electrode Active Material)

Examples of the positive electrode active material include lithium-transition metal composite oxides such as $LiMn_2O_4$, $LiCoO_2$, $LiNiO_2$, $Li(Ni-Mn-Co)O_2$, and those in which a part of these transition metals are substituted with other elements, lithium-transition metal phosphate compounds, and lithium-transition metal sulfate compounds. Depending on the cases, two or more kinds of positive electrode active materials may be used concurrently. A lithium-transition metal composite oxide is preferably used as the positive electrode active material from the viewpoint of capacity and output characteristics. Depending on the cases, two or more kinds of positive electrode active materials may be used concurrently.

$Li(Ni-Mn-Co)O_2$ and those in which a part of these transition metals are substituted with other elements (hereinafter, also simply referred to as the "NMC composite oxide") are more preferably used. The NMC composite oxide has a layered crystal structure in which a lithium atom layer and a transition metal (Mn, Ni, and Co are orderly disposed) atom layer are alternately laminated via an oxygen atom layer, one Li atom is contained per one atom of the transition metal, the amount of Li that can be taken out is twofold that of spinel type lithium manganese oxide, that is, the supply ability is twofold, and the NMC composite oxide can thus have a high capacity.

As described above, the NMC composite oxide also includes a composite oxide in which a part of the transition metal elements is substituted with other metal elements. Examples of the other elements in that case include Ti, Zr, Nb, W, P, Al, Mg, V, Ca, Sr, Cr, Fe, B, Ga, In, Si, Mo, Y, Sn, V, Cu, Ag, and Zn. The other elements are preferably Ti, Zr, Nb, W, P, Al, Mg, V, Ca, Sr, and Cr, the other elements are more preferably Ti, Zr, P, Al, Mg, and Cr, and from the viewpoint of improving the cycle characteristics, the other elements are further preferably Ti, Zr, Al, Mg, and Cr.

The NMC composite oxide preferably has a composition represented by General Formula (1): $Li_aNi_bMn_cCo_dM_xO_2$ (provided that, in the formula, a, b, c, d, and x satisfy $0.9 \le a \le 1.2$, $0 < b < 1$, $0 < c \le 0.5$, $0 < d \le 0.5$, and $0 \le x \le 0.3$; and M is at least one element selected from Ti, Zr, Nb, W, P, Al, Mg, V, Ca, Sr, and Cr) since the theoretical discharge capacity is high. Herein, a represents the atomic ratio of Li, b represents the atomic ratio of Ni, c represents the atomic ratio of Mn, d represents the atomic ratio of Co, and x represents the atomic ratio of M. Incidentally, the composition of the respective elements can be measured by, for example, inductively coupled plasma (ICP) emission spectrometry.

In general, it is known that nickel (Ni), cobalt (Co), and manganese (Mn) contribute to the capacity and output characteristics from the viewpoint of improving purity of the material and improving electron conductivity. Ti or the like partially substitutes the transition metal in the crystal lattice. From the viewpoint of cycle characteristics, a part of the transition element may be substituted with another metal element. In this case, it is preferable that $0 < x \le 0.3$ in General Formula (1) is satisfied. It is considered that the crystal structure is stabilized by a solid solution formed by at least one kind selected from the group consisting of Ti, Zr, Nb, W, P, Al, Mg, V, Ca, Sr, and Cr, and as a result, a decrease in capacity of the battery can be prevented even when charge and discharge are repeated and excellent cycle characteristics can be realized.

The NMC composite oxide can be produced by selecting various known methods such as a co-precipitation method and a spray drying method. It is preferable to use a co-precipitation method since the production of the composite oxide is easy. Specifically, for example, as the method described in JP 2011-105588 A, a nickel-cobalt-manganese composite hydroxide is produced by a co-precipitation method. Thereafter, the nickel-cobalt-manganese composite hydroxide is mixed with a lithium compound, and the mixture is calcined so that the NMC composite oxide can be obtained.

Incidentally, it is needless to say that a positive electrode active material other than those described above may be used.

The average particle diameter of the positive electrode active material contained in the positive electrode active material layer is not particularly limited, but is preferably 1 to 100 μm and more preferably 1 to 25 μm from the viewpoint of increasing the output.

The content of the positive electrode active material in the positive electrode active material layer is preferably 80 to 99.5% by weight and more preferably 85 to 99.5% by weight.

(Binder)

The binder used in the positive electrode active material layer is not particularly limited, and for example, the following materials are exemplified. Examples thereof include thermoplastic polymers such as polyethylene, polypropylene, polyethylene terephthalate (PET), polyether nitrile, polyacrylonitrile, polyimide, polyamide, cellulose, carboxymethyl cellulose (CMC) and a salt thereof, an ethylene-vinyl acetate copolymer, polyvinylidene chloride, styrene-butadiene rubber (SBR), isoprene rubber, butadiene rubber, ethylene-propylene rubber, an ethylene-propylene-diene copolymer, a styrene-butadiene-styrene block copolymer and a hydrogenated product thereof, and a styrene-isoprene-styrene block copolymer and a hydrogenated product thereof; fluorine resins such as polyvinylidene fluoride (PVdF), polytetrafluoroethylene (PTFE), a tetrafluoroethylene-hexafluoropropylene copolymer (FEP), a tetrafluoroethylene-perfluoroalkylvinylether copolymer (PFA), an ethylene-tetrafluoroethylene copolymer (ETFE), polychlorotrifluoroethylene (PCTFE), an ethylene-chlorotrifluoroethylene copolymer (ECTFE), and polyvinyl fluoride (PVF); vinylidene fluoride-based fluorine rubber such as vinylidene fluoride-hexafluoropropylene-based fluorine rubber (VDF-HFP-based fluorine rubber), vinylidene fluoride-hexafluoropropylene-tetrafluoroethylene-based fluorine rubber (VDF-HFP-TFE-based fluorine rubber), vinylidene fluoride-pentafluoropropylene-based fluorine rubber (VDF-PFP-based fluorine rubber), vinylidene fluoride-pentafluoropropylene-tetrafluoroethylene-based fluorine rubber (VDF-PFP-TFE-based fluorine rubber), vinylidene fluoride-perfluoromethyl vinyl ether-tetrafluoroethylene-based fluorine rubber (VDF-PFMVE-TFE-based fluorine rubber), and vinylidene fluoride-chlorotrifluoroethylene-based fluorine rubber (VDF-CTFE-based fluorine rubber); and an epoxy resin. These binders may be used singly or two or more kinds thereof may be used concurrently.

The amount of the binder contained in the positive electrode active material layer is not particularly limited as long as it is such an amount that the active material can be bound, but the amount of the binder is preferably 0.5 to 15% by weight and more preferably 1 to 10% by weight with respect to the active material layer.

The positive electrode active material layer further contains, if necessary, other additives such as a conductive aid, an electrolyte (a polymer matrix, an ion conductive polymer, an electrolyte solution, and the like), and a lithium salt for enhancing ion conductivity.

The conductive aid refers to an additive that is blended in order to improve the conductivity of the positive electrode active material layer or the negative electrode active material layer. Examples of the conductive aid include carbon materials such as carbon black including ketjen black, acetylene black, and the like, graphite, and a carbon fiber. When the active material layer contains the conductive aid, the electron network in the inside of the active material layer is effectively formed, thereby contributing to the improvement of output characteristics of the battery.

Examples of the electrolyte salt (lithium salt) include $Li(C_2F_5SO_2)_2N$, $LiPF_6$, $LiBF_4$, $LiClO_4$, $LiAsF_6$, and $LiCF_3SO_3$.

Examples of the ion conductive polymer include a polyethylene oxide (PEO)-based polymer and a polypropylene oxide (PPO)-based polymer.

The blending ratio of the components that are contained in the positive electrode active material layer and the negative electrode active material layer described later is not particularly limited. The blending ratio can be adjusted by appropriately referring to the known knowledge on a lithium ion secondary battery. The thickness of each active material layer is not particularly limited as well, and the known knowledge on a battery can be appropriately referred to. As an example, the thickness of each active material layer is about 2 to 100 μm.

[Negative Electrode]

The negative electrode includes a negative electrode current collector and a negative electrode active material layer formed on the surface of the negative electrode current collector.

[Negative Electrode Active Material Layer]

The negative electrode active material layer contains a negative electrode active material, and if necessary, further contains other additives such as a conductive aid, a binder, an electrolyte (a polymer matrix, an ion conductive polymer, an electrolyte solution, and the like), and a lithium salt for enhancing ion conductivity. The other additives such as a conductive aid, a binder, an electrolyte (a polymer matrix, an ion conductive polymer, an electrolyte solution, and the like), and a lithium salt for enhancing ion conductivity are the same as those described above in the section of the positive electrode active material layer.

Examples of the negative electrode active material include graphite such as artificial graphite, coated natural graphite, or natural graphite, a carbon material such as soft carbon or hard carbon, a lithium-transition metal composite oxide (for example, $Li_4Ti_5O_{12}$), a metal material, and a lithium alloy-based negative electrode material. Depending on the cases, two or more kinds of negative electrode active materials may be used concurrently. Preferably, a carbon material or a lithium-transition metal composite oxide is used as the negative electrode active material from the viewpoint of the capacity and output characteristics. Incidentally, it is needless to say that a negative electrode active material other than those described above may be used.

The average particle diameter of the negative electrode active material is not particularly limited, but is preferably 1 to 100 μm and more preferably 1 to 30 μm from the viewpoint of increasing the output.

The negative electrode active material layer preferably contains at least an aqueous binder. The aqueous binder exhibits a high binding force. In addition, procurement of water as a raw material is easy and also only water vapor is generated during drying, and thus there is an advantage that the investment on facilities of a production line can be greatly cut down and a decrease in environmental burden can be achieved.

The aqueous binder refers to a binder which has water as a solvent or a dispersion medium, and specific examples thereof include a thermoplastic resin, a polymer exhibiting rubber elasticity, a water-soluble polymer, and a mixture thereof. Herein, the binder which contains water as a dispersion medium includes all which are regarded as latex or an emulsion, and refers to a polymer that is emulsified in water or suspended in water. Examples thereof include a polymer latex obtained by emulsion polymerization in a self-emulsifying system.

Specific examples of the aqueous binder include a styrene polymer (styrene-butadiene rubber, a styrene-vinyl acetate copolymer, a styrene-acrylic copolymer, or the like), acrylonitrile-butadiene rubber, methyl methacrylate-butadiene rubber, a (meth)acrylic polymer (polyethyl acrylate, polyethyl methacrylate, polypropyl acrylate, polymethyl methacrylate (methyl methacrylate rubber), polypropyl methacrylate, polyisopropyl acrylate, polyisopropyl methacrylate, polybutyl acrylate, polybutyl methacrylate, polyhexyl acrylate, polyhexyl methacrylate, polyethylhexyl acrylate, polyethylhexyl methacrylate, polylauryl acrylate, polylauryl methacrylate, or the like), polytetrafluoroethylene, polyethylene, polypropylene, an ethylene-propylene copolymer, polybutadiene, butyl rubber, fluorine rubber, polyethylene oxide, polyepichlorohydrin, polyphosphagen, polyacrylonitrile, polystyrene, an ethylene-propylene-diene copolymer, polyvinylpyridine, chlorosulfonated polyethylene, a polyester resin, a phenolic resin, an epoxy resin; polyvinyl alcohol (the average polymerization degree is suitably 200 to 4000 and more suitably 1000 to 3000, and the saponification degree is suitably 80% by mol or more and more suitably 90% by mol or more) and a modified product thereof (a product obtained by saponifying 1 to 80% by mol of the vinyl acetate units in a copolymer of ethylene/vinyl acetate=2/98 to 30/70 (molar ratio), a product obtained by partially acetalizing polyvinyl alcohol at 1 to 50% by mol, or the like), starch and a modified product thereof (oxidized starch, phosphoric acid esterified starch, cationized starch, or the like), cellulose derivatives (carboxymethyl cellulose, methyl cellulose, hydroxypropyl cellulose, hydroxyethyl cellulose, a salt thereof, or the like), polyvinylpyrrolidone, polyacrylic acid (salt), polyethylene glycol, a copolymer of (meth)acrylamide and/or a (meth)acrylate salt [a (meth)acrylamide polymer, a (meth)acrylamide-(meth)acrylate salt copolymer, a (meth)acrylic acid alkyl (having 1 to 4 carbon atoms) ester-(meth)acrylate salt copolymer, or the like], a styrene-maleate salt copolymer, a mannich modified product of polyacrylamide, a formalin condensation type resin (a urea-formalin resin, a melamin-formalin resin, or the like), a polyamide polyamine or dialkylamine-epichlorohydrin copolymer, polyethyleneimine, casein, soybean protein, synthetic protein, and a water-soluble polymer such as a galactomannan derivative. These aqueous binders may be used singly or two or more kinds thereof may be used concurrently.

From the viewpoint of binding property, the aqueous binder preferably contains at least one rubber-based binder selected from the group consisting of styrene-butadiene rubber, acrylonitrile-butadiene rubber, methyl methacrylate-butadiene rubber, and methyl methacrylate rubber. Further, the aqueous binder preferably contains styrene-butadiene rubber since the binding property thereof is favorable.

In the case of using styrene-butadiene rubber as the aqueous binder, it is preferable to concurrently use the above-described water-soluble polymer from the viewpoint of the improvement in coating property. Examples of the water-soluble polymer which is suitably concurrently used with styrene-butadiene rubber include polyvinyl alcohol and a modified product thereof, starch and a modified product thereof, cellulose derivatives (carboxymethyl cellulose, methyl cellulose, hydroxyethyl cellulose, a salt thereof, or the like), polyvinylpyrrolidone, polyacrylic acid (salt), and polyethylene glycol. Among them, styrene-butadiene rubber and carboxymethyl cellulose (salt) are preferably combined as a binder. The weight content ratio of the styrene-butadiene rubber to the water-soluble polymer is not particularly limited, but it is preferable that the ratio of the styrene-butadiene rubber:the water-soluble polymer is 1:0.1 to 10 and more preferably 1:0.5 to 2.

The content of the aqueous binder of the binder used in the negative electrode active material layer is preferably 80 to 100% by weight, preferably 90 to 100% by weight, and preferably 100% by weight.

[Separator (Electrolyte Layer)]

The separator has a function to hold the electrolyte inside the pore so as to secure the lithium ion conductivity between the positive electrode and the negative electrode and also a function as a partition wall between the positive electrode and the negative electrode.

(Separator)

Examples of the separator shape include a porous sheet separator or a non-woven separator composed of a polymer or a fiber which absorbs and holds the electrolyte.

As the porous sheet separator composed of a polymer or a fiber, a microporous (microporous membrane) separator can be used, for example. Specific examples of the porous sheet composed of a polymer or a fiber include a microporous (microporous membrane) separator which is composed of a polyolefin such as polyethylene (PE) or polypropylene (PP); a laminate in which a plurality of these are laminated (for example, a laminate having a three-layer structure of PP/PE/PP), a hydrocarbon-based resin such as polyimide, aramid, or polyvinylidene fluoride-hexafluoropropylene (PVdF-HFP), or a glass fiber.

The thickness of the microporous (microporous membrane) separator cannot be uniformly defined as it varies depending on the use. For example, for use in a secondary battery for driving a motor of an electric vehicle (EV), a hybrid electric vehicle (HEV), a fuel cell vehicle (FCV), and the like, the thickness thereof is desirably 4 to 60 µm as a monolayer or a multilayer. The fine pore diameter of the microporous (microporous membrane) separator is desirably 1 µm or less at most (usually, the pore diameter is about several tens of nanometers).

As the non-woven separator, those known in the related art, such as cotton, rayon, acetate, nylon, polyester; a polyolefin such as PP or PE; polyimide, and aramid are used singly or as a mixture. In addition, the bulk density of the non-woven fabric is not particularly limited as long as sufficient battery characteristics are obtained by a polymer gel electrolyte impregnated into the non-woven fabric. Further, it is sufficient that the thickness of the non-woven separator is the same as that of the electrolyte layer. The thickness thereof is preferably 5 to 200 µm and particularly preferably 10 to 100 µm.

In addition, as described above, the separator holds an electrolyte inside the pore. The electrolyte is not particularly limited as long as it can exhibit such functions, but a liquid electrolyte or a gel polymer electrolyte may be used. The distance between electrodes is stabilized, an occurrence of polarization is suppressed, and the durability (cycle characteristics) is improved as a gel polymer electrolyte is used.

(Ratio of Capacity to Pore Volume of Separator)

In the non-aqueous electrolyte secondary battery according to this aspect, the ratio of the rated capacity to the pore volume of the separator is 1.55 Ah/cc or more. The ratio value of the rated capacity to the pore volume of the separator corresponds to an index indicating the degree of electro-current constriction (current density) per unit pore volume. Herein, in the unit (g/cc) of the density (apparent density; bulk density) of the separator, it is necessary to take into consideration the density (true density) of a constituent material itself of the separator. For example, if the density (true density) of a material constituting a solid portion of the separator is small, even when the same degree of pores exists in the same volume, the density (apparent density; bulk density) of the separator is decreased as compared to a case where the density (true density) is large, and thus the ratio value of the rated capacity to the pore volume of the separator is not sufficient as an index indicating how densely a separator material is filled per unit volume. For this reason, herein, the ratio of the rated capacity to the pore volume of the separator is defined to be used as an index for a current density per unit pore volume. In addition, lithium ions in the separator increase as the capacity of the battery is increased (the rated capacity is increased); on the other hand, diffusibility of lithium ions is degraded as the pore volume in the separator decreases. Therefore, the ratio of the rated capacity to the pore volume of the separator corresponds to an index for diffusibility of lithium ions in the separator, and even under an environment of low diffusibility of lithium ions in which the ratio of the rated capacity to the pore volume of the separator is 1.55 Ah/cc or more, by employing the configuration in which the variation in porosity in the separator is decreased as in this aspect, cycle durability is significantly improved.

Incidentally, the upper limit of the ratio of the rated capacity to the pore volume of the separator is not particularly limited, but in consideration of diffusibility of lithium ions, the ratio of the rated capacity to the pore volume of the separator is preferably 3.50 Ah/cc or less, and from the viewpoint of increasing the capacity and improving diffusibility of lithium ions, the ratio is more preferably 1.55 to 3.00 Ah/cc.

As the rated capacity, a value measured by the following method is employed.

The rated capacity is measured by the following procedures 1 and 2 at a temperature of 25° C. in a predetermined voltage range.

Procedure 1: After the voltage reaches the upper limit voltage at a constant current charge of 0.2 C, charge for 2.5 hours at a constant voltage charge, and then rest for 10 seconds.

Procedure 2: After the voltage reaches the lower limit voltage at a constant current discharge of 0.2 C, rest for 10 seconds.

Rated capacity: Discharge capacity in constant current discharge (CC discharge capacity) in the procedure 2 is regarded as the rated capacity.

Further, the pore volume of the separator is measured as follows. The separator is extracted from the non-aqueous electrolyte secondary battery and then cut into a sample of 3 cm×3 cm. The volume of pores (micropores) existing in the sample is measured by a mercury intrusion method using a mercury intrusion porosimeter according to micropore distribution measurement. In a case where a capillary tube is set upright in a liquid, a liquid wetting a wall ascends in the capillary; on the other hand, a liquid not wetting a wall descends. It is needless to say that, in this capillary phenomenon, pressure acts in meniscus due to surface tension so that a material not wetted by a general substance, such as mercury, does not enter the inside of the capillary until pressure is applied. Since a mercury porosimeter uses the above-described matter, mercury is press-intruded to micropores, and then the diameter of micropores is obtained from a necessary pressure and the micropore volume is obtained from the press-intruded amount.

[Variation in Porosity in Separator]

In the non-aqueous electrolyte secondary battery according to this aspect, the variation in porosity in the separator is 4.0% or less. Further, in a more preferred embodiment, the ratio of the rated capacity to the pore volume of the separator is 2.1 Ah/cc or more and the variation in porosity in the separator is 3.0% or less. In a higher-capacity non-aqueous electrolyte secondary battery in which the ratio of the rated capacity to the pore volume of the separator is 2.1 Ah/cc or more, by setting the variation in porosity in the separator to 3.0% or less, cycle durability (capacity retention rate) is significantly improved. Herein, as the capacity of the battery increases, a malign influence of the variation in porosity on cycle durability becomes further significant, and thus uniformity of pores of the separator is further requested as well. However, according to studies of the present inventors, it has been found that, even in such a high-capacity battery, by setting the variation in porosity in the separator to 4.0% or less, a high capacity retention rate of 88% or more can be achieved. Further, in another preferred embodiment, the variation in porosity in the separator is 3.0% or less. With such a configuration, cycle durability of the battery can be further improved.

A smaller variation in porosity in the separator is preferable. However, when the variation is tried to be decreased, production efficiency of the battery is degraded. Meanwhile, from results of Examples described later, it is found that the effect of improving cycle durability is saturated at a variation in porosity in the separator of about 2%. Therefore, in consideration of the productivity (yield) and saturation of the effect, the variation in porosity in the separator is preferably 0.5% or more and further preferably 1.0% or more. Incidentally, as the variation in porosity in the separator, a value calculated by a method described in the section of Examples described later is employed.

A method of controlling a value of the variation in porosity in the separator to the aforementioned ranges is not particularly limited, and a method conventionally proposed for decreasing the variation in porosity in the separator can be used similarly.

As a constituent material of the separator, an olefin-based resin porous film suitably used as a porous film having a large number of pores therein is used, and as a method for forming an olefin-based resin porous film, a conventionally known method such as a wet method or a stretching method is used.

As a method for producing an olefin-based resin porous film by a wet method, for example, there is exemplified a method in which an olefin-based resin composition obtained by mixing an olefin-based resin, a filler, and a plasticizer is formed to obtain an olefin-based resin film and the filler and the plasticizer are extracted from the olefin-based resin film to obtain an olefin-based resin porous film in which micropores are formed. Meanwhile, as a method for producing an olefin-based resin porous film by a stretching method, there is exemplified a method in which an olefin-based resin film containing an olefin-based resin is stretched uniaxially or biaxially to obtain an olefin-based resin porous film in which micropores are formed.

Among them, an olefin-based resin porous film produced by a stretching method is more preferable as the olefin-based resin porous film. The olefin-based resin porous film produced by the stretching method is likely to undergo thermal shrinkage at high temperature due to residual strain caused by stretching.

Specific examples of the method for producing the olefin-based resin porous film by the stretching method include a method of extruding an olefin-based resin to obtain an olefin-based resin film, generating and growing lamella crystals in the olefin-based resin film, and stretching the olefin-based resin film to separate the lamella crystals from each other, whereby an olefin-based resin porous film having micropores formed therein is obtained; and a method of extruding an olefin-based resin composition obtained by mixing an olefin-based resin and a filler to obtain an olefin-based resin film and stretching the olefin-based resin film uniaxially or biaxially to separate the olefin-based resin from the filler at their interfaces, whereby an olefin-based resin porous film having micropores formed therein is obtained. The former method is preferable since an olefin-based resin porous film with a large number of micropores uniformly formed is obtained.

Particularly preferable examples of the method of producing the olefin-based resin porous film include a method including the following steps:

an extruding step of melting and kneading an olefin-based resin in an extruder at a temperature equal to or higher than a temperature higher by 20° C. than the melting point of the olefin-based resin and equal to or lower than a temperature higher by 100° C. than the melting point of the olefin-based resin and then extruding the resultant olefin-based resin from a T die attached to the tip end of the extruder to thereby obtain an olefin-based resin film;

an aging step of, after the extruding step, aging the olefin-based resin film at a temperature equal to or higher than a temperature lower by 30° C. than the melting point of the olefin-based resin and equal to or lower than a temperature lower by 1° C. than the melting point of the olefin-based resin;

a first stretching step of, after the aging step, stretching the olefin-based resin film uniaxially at a stretching ratio of 1.2 to 1.6 times at a surface temperature of −20° C. or higher and lower than 100° C.;

a second stretching step of stretching the olefin-based resin film subjected to stretching in the first stretching step uniaxially at a stretching ratio of 1.2 to 2.2 times at a surface temperature of 100 to 150° C.; and an annealing step of annealing the olefin-based resin film subjected to stretching in the second stretching step.

According to the method, an olefin-based resin porous film with a large number of micropores, which communicate with each other, uniformly formed can be obtained. Therefore, by using such an olefin-based resin porous film as the separator, the variation in porosity in the separator is easily controlled to a value in the predetermined range of the present application. In addition, since a large number of micropores are uniformly formed, the olefin-based resin porous film obtained by the method has excellent air permeability, and lithium ions can permeate the film smoothly and uniformly. Therefore, by applying such an olefin-based resin porous film as a porous substrate film to the separator, the internal resistance of the non-aqueous electrolyte secondary battery can be reduced, and such a non-aqueous electrolyte secondary battery can be charged and discharged at a high current density in high-power applications such as vehicles including electric vehicles and the like. Further, even in a case where overcharging or the like occurs and thus the temperature inside the battery increases, the occurrence of an electric short circuit between the positive electrode and the negative electrode can be highly suppressed, and as a result, safety of the battery can be sufficiently secured.

(Extruding Step)

The olefin-based resin film containing the olefin-based resin can be produced by supplying the olefin-based resin to the extruder, melting and kneading the olefin-based resin, and then extruding the resultant olefin-based resin from the T die attached to the tip end of the extruder.

The temperature of the olefin-based resin when melted and kneaded in the extruder is preferably equal to or higher than a temperature higher by 20° C. than the melting point of the olefin-based resin and equal to or lower than a temperature higher by 100° C. than the melting point of the olefin-based resin, more preferably equal to or higher than a temperature higher by 25° C. than the melting point of the olefin-based resin and equal to or lower than a temperature higher by 80° C. than the melting point of the olefin-based resin, and particularly preferably equal to or higher than a temperature higher by 25° C. than the melting point of the olefin-based resin and equal to or lower than a temperature higher by 50° C. than the melting point of the olefin-based resin. By setting the temperature of the olefin-based resin during melting and kneading to a temperature equal to or higher than a temperature higher by 20° C. than the melting point of the olefin-based resin, an olefin-based resin porous film having a uniform thickness can be obtained. In addition, by setting the temperature of the olefin-based resin during melting and kneading to a temperature equal to or lower than a temperature higher by 100° C. than the melting point of the olefin-based resin, the orientation of the olefin-based resin is improved and thus the generation of lamellas can be accelerated.

The draw ratio when the olefin-based resin is extruded from the extruder into a film shape is preferably 50 to 300, more preferably 65 to 250, and particularly preferably 70 to 250. By setting the draw ratio when the olefin-based resin is extruded from the extruder into a film shape to 50 or more, the tension applied to the olefin-based resin is increased, and accordingly, olefin-based resin molecules are sufficiently oriented so that the generation of lamellas can be accelerated. Further, by setting the draw ratio when the olefin-based resin is extruded from the extruder into a film shape to 300 or less, the film-forming stability of the olefin-based resin film is improved so that an olefin-based resin porous film having a uniform thickness and width can be obtained. Incidentally, the draw ratio is a value obtained by dividing the clearance of the lip of the T die by the thickness of the olefin-based resin film extruded from the T die. The clearance of the lip of the T die is measured as follows. The measurement of the clearance of the lip of the T die is performed at 10 or more sites using a feeler gauge according to JIS B7524 (for example, JIS feeler gauge manufactured by Nagai Gauges), and the arithmetic average of the measured values is computed. Further, the thickness of the olefin-based resin film extruded from the T die is measured as follows. The measurement of the thickness of the olefin-based resin film extruded from the T die is performed at 10 or more sites using a dial gauge (for example, Signal ABS Digimatic Indicator, manufactured by Mitutoyo Corporation), and the arithmetic average of the measured values is computed.

Further, the film-forming rate of the olefin-based resin film is preferably 10 to 300 m/min, more preferably 15 to 250 m/min, and particularly preferably 15 to 30 m/min. By setting the film-forming rate of the olefin-based resin film to 10 m/min or more, the tension applied to the olefin-based resin is improved, and accordingly, olefin-based resin molecules are sufficiently oriented so that the generation of lamellas can be accelerated. In addition, by setting the film-forming rate of the olefin-based resin film to 300 m/min or less, the film-forming stability of the olefin-based resin film is improved so that an olefin-based resin porous film having a uniform thickness and width can be obtained.

Then, when the olefin-based resin film extruded from the T die is cooled until the surface temperature thereof becomes equal to or lower than a temperature lower by 100° C. than the melting point of the olefin-based resin, the olefin-based resin forming the olefin-based resin film is crystallized, and lamellas are generated. In addition, the kneaded molten olefin-based resin is extruded to orient the olefin-based resin molecules constituting the olefin-based resin film in advance, and the olefin-based resin film in this state is cooled. In this manner, the generation of lamellas can be accelerated in portions where the olefin-based resin is oriented.

The surface temperature of the cooled olefin-based resin film is preferably equal to or lower than a temperature lower by 100° C. than the melting point of the olefin-based resin, more preferably lower by 140 to 110° C. than the melting point of the olefin-based resin, and particularly preferably lower by 135 to 120° C. than the melting point of the olefin-based resin. By cooling the olefin-based resin film to such a surface temperature, the olefin-based resin forming the olefin-based resin film can be sufficiently crystallized.

(Aging Step)

Next, the olefin-based resin film obtained in the extruding step described above is aged. The aging step for the olefin-based resin is performed in order to grow the lamella generated in the olefin-based resin film in the extruding step. In this manner, a laminated lamella structure in which crystallized portions (lamellas) and non-crystallized portions are arranged alternately in the extrusion direction of the olefin-based resin film can be formed. Therefore, in the stretching steps of the olefin-based resin film described later, cracks are formed not in the lamellas but between the lamellas, and micropores starting from these cracks can be formed.

In the aging step, the olefin-based resin film obtained in the extruding step is aged at a temperature equal to or higher than a temperature lower by 30° C. than the melting point of the olefin-based resin and equal to or lower than a temperature lower by 1° C. than the melting point of the olefin-based resin.

The aging temperature of the olefin-based resin film is preferably equal to or higher than a temperature lower by 30° C. than the melting point of the olefin-based resin and equal to or lower than a temperature lower by 1° C. than the melting point of the olefin-based resin and more preferably equal to or higher than a temperature lower by 25° C. than the melting point of the olefin-based resin and equal to or lower than a temperature lower by 10° C. than the melting point of the olefin-based resin. By setting the aging temperature of the olefin-based resin film to a temperature equal to or higher than a temperature lower by 30° C. than the melting point of the olefin-based resin, the crystallization of the olefin-based resin film is accelerated, and micropores can be easily formed between lamellas of the olefin-based resin film in the stretching step described later. In addition, by setting the aging temperature of the olefin-based resin film to a temperature equal to or lower than a temperature lower by 1° C. than the melting point of the olefin-based resin, the collapse of the lamella structure due to relaxation of the molecular orientation of the olefin-based resin can be reduced.

Incidentally, the aging temperature of the olefin-based resin film is the surface temperature of the olefin-based resin film. However, in a case where the surface temperature of the olefin-based resin film cannot be measured, for example, in a case where the olefin-based resin film wound into a roll is aged, the ambient temperature is used as the aging temperature of the olefin-based resin film. For example, in a case where the olefin-based resin film wound into a roll is aged inside a heating apparatus such as a hot-air oven, the temperature inside the heating apparatus is used as the aging temperature.

The olefin-based resin film may be aged while the olefin-based resin film is running or in a state of the olefin-based resin film being wound into a roll.

In a case where the olefin-based resin film may be aged while the olefin-based resin film is running, the aging time of the olefin-based resin film is preferably 1 minute or longer and more preferably 5 minutes to 60 minutes.

In a case where the olefin-based resin film wound into a roll is aged, the aging time is preferably 1 hour or longer and more preferably 15 hours or longer. By aging the olefin-based resin film wound into a roll for such an aging time, the olefin-based resin film as a whole from the surface of the roll to the inside thereof can be sufficiently aged by setting the temperature of the olefin-based resin film to the aging temperature described above, and lamellas of the olefin-based resin film can be sufficiently grown. In addition, in order to suppress thermal degradation of the olefin-based resin film, the aging time is preferably 35 hours or shorter and more preferably 30 hours or shorter.

Incidentally, in a case where the olefin-based resin film wound into a roll is aged, the stretching steps and annealing step described later may be performed on the olefin-based resin film unwound from the roll of the olefin-based resin film subjected to the aging step.

(First Stretching Step)

Next, the olefin-based resin film after the aging step is subjected to the first stretching step in which the olefin-based resin film is uniaxially stretched at a stretching ratio of 1.2 to 1.6 times and a surface temperature of −20° C. or higher and lower than 100° C. In the first stretching step, it is preferable to stretch the olefin-based resin film uniaxially only in the extrusion direction. In the first stretching step, almost no lamellas in the olefin-based resin film are melted. By separating the lamellas from each other by stretching, fine cracks are independently formed in non-crystalline portions between the lamellas in an efficient manner, and a large number of micropores starting from the cracks are formed in a reliable manner.

In the first stretching step, the surface temperature of the olefin-based resin film is preferably −20° C. or higher and lower than 100° C., more preferably 0 to 80° C., and particularly preferably 10 to 40° C. By setting the surface temperature of the olefin-based resin film to −20° C. or higher, breakage of the olefin-based resin film during stretching can be reduced. In addition, by setting the surface temperature of the olefin-based resin film to lower than 100° C., cracks can be generated in the non-crystalline portions between the lamellas.

In the first stretching step, the stretching ratio of the olefin-based resin film is preferably 1.2 to 1.6 times and more preferably 1.25 to 1.5 times. By setting the stretching ratio of the olefin-based resin film to 1.2 times or more, micropores are formed in the non-crystalline portions between the lamellas, and accordingly, it is possible to provide an olefin-based resin porous film which is excellent in air permeability and has a low resistance when lithium ions permeate the film. In addition, by setting the stretching ratio of the olefin-based resin film to 1.6 times or less, micropores can be uniformly formed in the olefin-based resin porous film. By applying the olefin-based resin porous film obtained in this way to the separator, the variation in porosity in the separator is easily controlled to a value in the predetermined range of the present application. Incidentally, in the present invention, the stretching ratio of the olefin-based resin film is a value obtained by dividing the length of the olefin-based resin film after stretching by the length of the olefin-based resin film before stretching.

The stretching speed of the olefin-based resin film in the first stretching step is preferably 20%/min or more. By setting the stretching speed to 20%/min or more, micropores can be uniformly formed in the non-crystalline portions between the lamellas. In addition, the stretching speed of the olefin-based resin film in the first stretching step is more preferably 20 to 500%/min and particularly preferably 20 to 70%/min. By setting the stretching speed to 500%/min or less, breakage of the olefin-based resin film can be suppressed.

Incidentally, the stretching speed of the olefin-based resin film is a ratio of a change in dimension per unit time in the stretching direction of the olefin-based resin film.

The method of stretching the olefin-based resin film in the first stretching step is not particularly limited as long as the olefin-based resin film can be stretched uniaxially. Examples thereof include a method in which the olefin-based resin film is stretched uniaxially at a predetermined temperature using a uniaxial stretching apparatus.

(Second Stretching Step)

Next, the olefin-based resin film subjected to the first stretching step is subjected to the second stretching step in which the olefin-based resin film is subjected to uniaxial stretching treatment at a stretching ratio of 1.2 to 2.2 times and a surface temperature of 100 to 150° C. Also in the second stretching step, it is preferable to stretch the olefin-based resin film uniaxially only in the extrusion direction. By performing such stretching treatment in the second stretching step, a large number of micropores formed in the olefin-based resin film in the first stretching step can be grown.

In the second stretching step, the surface temperature of the olefin-based resin film is preferably 100 to 150° C. and more preferably 110 to 140° C. By setting the surface temperature of the olefin-based resin film to 100° C. or higher, micropores formed in the olefin-based resin film in the first stretching step are grown, and thus the air permeability of the olefin-based resin porous film can be improved. In addition, by setting the surface temperature of the olefin-based resin film to 150° C. or lower, clogging of the micropores formed in the olefin-based resin film in the first stretching step can be suppressed.

In the second stretching step, the stretching ratio of the olefin-based resin film is preferably 1.2 to 2.2 times and more preferably 1.5 to 2 times. By the stretching ratio of the olefin-based resin film to 1.2 times or more, micropores formed in the olefin-based resin film in the first stretching step are grown, and thus it is possible to provide an olefin-based resin porous film having excellent air permeability. In addition, by setting the stretching ratio of the olefin-based resin film to 2.2 times or less, clogging of the micropores formed in the olefin-based resin film in the first stretching step can be suppressed.

In the second stretching step, the stretching speed of the olefin-based resin film is preferably 500%/min or less, more preferably 400%/min or less, and particularly preferably 15 to 60%/min. By the stretching speed of the olefin-based resin film in the above range, micropores can be uniformly formed in the olefin-based resin film. By applying the olefin-based resin porous film obtained in this way to the separator, the variation in porosity in the separator is easily controlled to a value in the predetermined range of the present application.

The method of stretching the olefin-based resin film in the second stretching step is not particularly limited as long as the olefin-based resin film can be stretched uniaxially. Examples thereof include a method in which the olefin-based resin film is stretched uniaxially at a predetermined temperature using a uniaxial stretching apparatus.

(Annealing Step)

Next, the annealing step in which the olefin-based resin film stretched in the second stretching step is subjected to annealing treatment is performed. The annealing step is performed in order to relax residual strain generated in the olefin-based resin film due to stretching performed in the above-described stretching steps to thereby suppress the occurrence of thermal shrinkage in the obtained olefin-based resin microporous film.

The surface temperature of the olefin-based resin film in the annealing step is preferably equal to or higher than the surface temperature of the olefin-based resin film in the second stretching step and equal to or lower than a temperature lower by 10° C. than the melting point of the olefin-based resin. By setting the surface temperature of the olefin-based resin film to a temperature equal to or higher than the surface temperature of the olefin-based resin film in the second stretching step, the residual strain in the olefin-based resin film is sufficiently relaxed, and thus the dimensional stability of the olefin-based resin porous film thus obtained during heating can be improved. In addition, by setting the surface temperature of the olefin-based resin film to a temperature equal to or lower than a temperature lower by 10° C. than the melting point of the olefin-based resin, clogging of the micropores formed in the stretching steps can be suppressed.

The shrinkage ratio of the olefin-based resin film in the annealing step is preferably set to 20% or less. By setting the shrinkage ratio of the olefin-based resin film to 20% or less, the occurrence of slack in the olefin-based resin film is reduced, and thus the olefin-based resin film can be uniformly annealed. Incidentally, the shrinkage ratio of the olefin-based resin film is a value obtained by dividing the shrinkage length of the olefin-based resin film in the stretching direction in the annealing step by the length of the olefin-based resin film in the stretching direction after the second stretching step and then multiplying the quotient by 100.

By appropriately controlling the conditions and the methods (for example, the cooling rate after extraction, the stretching ratio, the stretching speed, and crystal transformation) in the above-described respective steps, the variation in porosity in the separator when an olefin-based porous film is applied to the separator can be decreased.

(Electrolyte)

The liquid electrolyte has a function as a carrier of lithium ion. The liquid electrolyte constituting the electrolyte solution layer has a form in which a lithium salt as a supporting salt is dissolved in an organic solvent as a plasticizer. Examples of the organic solvent which can be used include carbonates such as ethylene carbonate (EC), propylene carbonate (PC), dimethyl carbonate (DMC), diethyl carbonate (DEC), and ethylmethyl carbonate (EMC). Further, as the lithium salt, a compound which may be added to an active material layer of an electrode, such as $Li(CF_3SO_2)_2N$, $Li(C_2F_5SO_2)_2N$, $LiPF_6$, $LiBF_4$, $LiClO_4$, $LiAsF_6$, $LiTaF_6$, and $LiCF_3SO_3$, can be adopted in the same manner. The liquid electrolyte may further contain an additive in addition to the components described above. Specific examples of such a compound include vinylene carbonate, methyl vinylene carbonate, dimethyl vinylene carbonate, phenyl vinylene carbonate, diphenyl vinylene carbonate, ethyl vinylene carbonate, diethyl vinylene carbonate, vinyl ethylene carbonate, 1,2-divinyl ethylene carbonate, 1-methyl-1-vinyl ethylene carbonate, 1-methyl-2-vinyl ethylene carbonate, 1-ethyl-1-vinyl ethylene carbonate, 1-ethyl-2-vinyl ethylene carbonate, vinyl vinylene carbonate, allyl ethylene carbonate, vinyloxymethyl ethylene carbonate, allyloxymethyl ethylene carbonate, acryloxymethyl ethylene carbonate, methacryloxymethyl ethylene carbonate, ethynyl ethylene carbonate, propargyl ethylene carbonate, ethynyloxymethyl ethylene carbonate, propargyloxyethylene carbonate, methylene ethylene carbonate, and 1,1-dimethyl-2-methylene ethylene carbonate. Among them, vinylene carbonate, methyl vinylene carbonate, and vinyl ethylene carbonate are preferable, and vinylene carbonate and vinyl ethylene carbonate are more preferable. These cyclic carbonates may be used singly or two or more kinds thereof may be used concurrently.

The gel polymer electrolyte has a configuration in which the above-described liquid electrolyte is injected into a matrix polymer (host polymer) consisting of an ion conductive polymer. Using a gel polymer electrolyte as an electrolyte is excellent in that the fluidity of the electrolyte disappears and ion conductivity between the respective layers is blocked. Examples of the ion conductive polymer which is used as the matrix polymer (host polymer) include polyethylene oxide (PEO), polypropylene oxide (PPO), polyethylene glycol (PEG), polyacrylonitrile (PAN), polyvinylidene fluoride-hexafluoropropylene (PVdF-HEP), poly(methyl methacrylate) (PMMA), and a copolymer thereof.

The matrix polymer of the gel electrolyte can exhibit an excellent mechanical strength as it forms a cross-linked structure. In order to form a cross-linked structure, it is sufficient to conduct a polymerization treatment, such as thermal polymerization, UV polymerization, radiation polymerization, or electron beam polymerization, of a polymerizable polymer for forming a polymer electrolyte (for example, PEO or PPO) using a proper polymerization initiator.

In addition, as a separator, a separator in which a heat resistant insulating layer is laminated on a porous substrate (a separator with a heat resistant insulating layer) may be used. In this case, when "the rated capacity to the pore volume of the separator" and "the variation in porosity in the separator" according to the present invention are measured, measurement is performed using a laminate of a heat resistant insulating layer and a porous substrate. The heat resistant insulating layer is a ceramic layer containing inorganic particles and a binder. As the separator with a heat resistant insulating layer, those exhibiting high heat resistance, namely, having a melting point or a heat softening point of 150° C. or higher and preferably 200° C. or higher, are used. By having a heat resistant insulating layer, internal stress of the separator which increases when the temperature increases is alleviated so that the effect of suppressing thermal shrinkage can be obtained. As a result, an occurrence of a short circuit between electrodes of the battery can be prevented so that a battery configuration in which the deterioration in performance due to an increase in temperature hardly occurs is obtained. In addition, by having a heat resistant insulating layer, the mechanical strength of the separator with a heat resistant insulating layer is improved so that the membrane of the separator is hardly broken. Further, because of the effect of suppressing thermal shrinkage and a high mechanical strength, the separator is hardly curled during the producing process of the battery.

The inorganic particles in the heat resistant insulating layer contribute to the mechanical strength or the effect of suppressing thermal shrinkage of the heat resistant insulating layer. The material used as the inorganic particles is not particularly limited. Examples thereof include oxides ($SiO_2$, $Al_2O_3$, $ZrO_2$, and $TiO_2$), hydroxides, and nitrides of silicon, aluminum, zirconium, and titanium, and a composite thereof. These inorganic particles may be those which are derived from mineral resources such as boehmite, zeolite, apatite, kaolin, mullite, spinel, olivine, and mica, or those which are artificially synthesized. Further, these inorganic particles may be used singly or two or more kinds thereof may be used concurrently. Among them, it is preferable to use silica ($SiO_2$) or alumina ($Al_2O_3$) and it is more preferable to use alumina ($Al_2O_3$) from the viewpoint of cost.

The weight per unit area of heat resistant insulating particles is not particularly limited, but is preferably 5 to 15 $g/m^2$. It is preferable that the weight per unit area is within this range since sufficient ion conductivity is obtained and the heat resistant strength is maintained.

The binder in the heat resistant insulating layer has a role to bond the inorganic particles to one another or the inorganic particles to a resin porous substrate layer. The heat resistant insulating layer is stably formed by this binder and also peeling between the porous substrate layer and the heat resistant insulating layer is prevented.

The binder used in the heat resistant insulating layer is not particularly limited, and for example, compounds such as carboxymethyl cellulose (CMC), polyacrylonitrile, cellulose, an ethylene-vinyl acetate copolymer, polyvinylidene chloride, styrene-butadiene rubber (SBR), isoprene rubber, butadiene rubber, polyvinylidene fluoride (PVDF), polytetrafluoroethylene (PTFE), polyvinyl fluoride (PVF), and methyl acrylate can be used as the binder. Among these, carboxymethyl cellulose (CMC), methyl acrylate, or polyvinylidene fluoride (PVDF) is preferably used. These compounds may be used singly or two or more kinds thereof may be used concurrently.

The content of the binder in the heat resistant insulating layer is preferably 2 to 20% by weight with respect to 100% by weight of the heat resistant insulating layer. When the content of the binder is 2% by weight or more, the peeling strength between the heat resistant insulating layer and the porous substrate layer can be enhanced and vibration resistance of the separator can be improved. On the other hand, when the content of the binder is 20% by weight or less, a gap between the inorganic particles is properly kept so that sufficient lithium ion conductivity can be secured.

The thermal shrinkage rate of the separator with a heat resistant insulating layer is preferably 10% or less in both MD and TD after being held for 1 hour under the condition of 150° C. and 2 $gf/cm^2$. Shrinkage of the separator can be effectively prevented even when the internal temperature of the battery reaches 150° C. due to an increased amount of heat generated from the positive electrode as such a highly heat resistant material is used. As a result, an occurrence of a short circuit between electrodes of the battery can be prevented so that a battery configuration in which the deterioration in performance due to an increase in temperature hardly occurs is obtained.

[Positive Electrode Current Collecting Plate and Negative Electrode Current Collecting Plate]

The material of the current collecting plate (25, 27) is not particularly limited, and a known highly conductive material which has been used as a current collecting plate for a lithium ion secondary battery in the related art can be used. Preferred examples of the material constituting the current collecting plate include metal materials such as aluminum, copper, titanium, nickel, stainless steel (SUS), and an alloy thereof. From the viewpoint of light weightiness, resistance to corrosion, and high conductivity, aluminum and copper are more preferable, and aluminum is particularly preferable. Incidentally, the same material or different materials may be used in the positive electrode current collecting plate 27 and the negative electrode current collecting plate 25.

[Positive Electrode Lead and Negative Electrode Lead]

Further, although it is not illustrated, the current collector (11, 12) and the current collecting plate (25, 27) may be electrically connected to each other via a positive electrode lead or a negative electrode lead. A known material that is used in a lithium ion secondary battery of the related art can be used as the material constituting the positive electrode lead and the negative electrode lead in the same manner. Incidentally, a portion taken out from the outer casing body is preferably coated with a heat resistant and insulating thermally shrunken tube or the like so that it is not in contact with the neighboring device or wire to cause electric leakage which affects the product (for example, an automobile component, in particular, an electronic device or the like).

[Battery Outer Casing Body]

As the battery outer casing material 29, an envelope-shaped casing which can cover the power generating element and uses a laminate film containing aluminum can be used in addition to a known metal can casing. As the laminate film, a laminate film having a three-layer structure formed by laminating PP, aluminum, and nylon in this order can be used, but it is not limited thereto. A laminate film is preferable and an aluminate laminate is more preferable from the viewpoint of an increase in output and excellent cooling performance and of being suitably utilizable in a battery for a large-sized device for EV or HEV.

[Cell Size]

Figure 3:
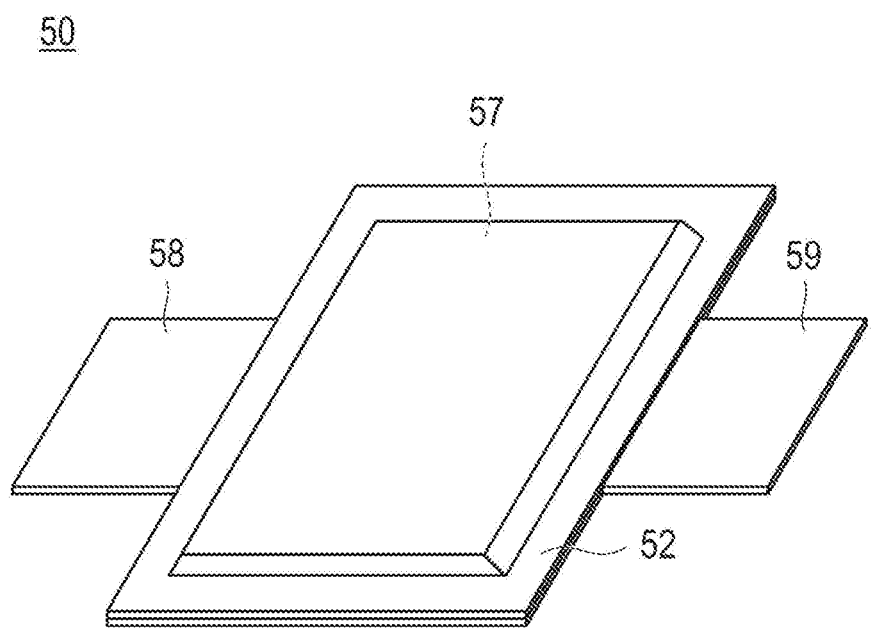
FIG. 3 is a perspective view illustrating an appearance of a flat lithium ion secondary battery as a representative embodiment of the non-aqueous electrolyte secondary battery.

FIG. 3 is a perspective view illustrating an appearance of a flat lithium ion secondary battery as a representative embodiment of the secondary battery. According to a preferred embodiment of the present invention, a flat stack type laminate battery obtained by sealing the power generating element in a battery outer casing material formed of a laminate film containing aluminum such as this lithium ion secondary battery is provided. When the battery is a flat stack type laminate battery in this way, the capacity can be increased.

As illustrated in FIG. 3, a flat lithium ion secondary battery 50 has a rectangular flat shape, and a positive electrode tab 58 and a negative electrode tab 59 are taken out from both sides for extracting the electric power. A power generating element 57 is covered with a battery outer casing material 52 of the lithium ion secondary battery 50 and the periphery of the battery outer casing material 52 is fused by heat. The power generating element 57 is sealed in a state where the positive electrode tab 58 and the negative electrode tab 59 are taken out to the outside. Herein, the power generating element 57 corresponds to the power generating element 21 of the lithium ion secondary battery 10 illustrated in FIG. 1 described above. The power generating element 57 is one in which a plurality of single battery layers (single cells) 19, which are each constituted by the positive electrode (positive electrode active material layer) 15, the electrolyte layer 17, and the negative electrode (negative electrode active material layer) 13 are laminated.

Incidentally, the lithium ion secondary battery is not limited to those having a flat shape of a laminate type. However, from the viewpoint of having high mounting efficiency to an automobile, a flat shape is preferable, and from the viewpoint that the capacity can be increased, a laminate type is more preferable.

In addition, the taking out of the tabs 58 and 59 illustrated in FIG. 3 is not particularly limited as well. The positive electrode tab 58 and the negative electrode tab 59 may be taken out from the same side or each of the positive electrode tab 58 and the negative electrode tab 59 may be divided into a plurality of tabs and then taken out from each side, and it is not limited to the form illustrated in FIG. 3.

[Ratio of Battery Area (Projected Area of Battery Including Battery Outer Casing Body) to Rated Capacity and Rated Discharge Capacity]

A general electric vehicle has a battery storage space of about 170 L. A cell and an auxiliary machine such as a device for controlling charge and discharge are stored in this space, and thus the storage space efficiency of a common cell is about 50%. The cell loading efficiency into this space is a factor to determine the cruising distance of an electric vehicle. The loading efficiency is impaired as the size of the single cell decreases, and thus it is not possible to secure the cruising distance.

Therefore, in the present invention, the battery structure of which the power generating element is covered with an outer casing body preferably has a large size. Further, as described above, in the large-sized battery, the effect of the present invention is significantly exerted. Specifically, in the non-aqueous electrolyte secondary battery according to this aspect, largeness of the battery is defined from a relation between the battery area and the battery capacity. Specifically, the non-aqueous electrolyte secondary battery according to this aspect has a ratio value of the battery area (a projected area of the battery including the battery outer casing body) to the rated capacity of $4.0$ $cm^2/Ah$ or more. In this aspect, since the rated capacity is large, that is, 30 Ah or more as described later, the battery area (the projected area of the battery including the battery outer casing body) is inevitably 120 $cm^2$ or more, and thus the battery has a large size. In view of a high capacity, a higher ratio of the battery area (the projected area of the battery including the battery outer casing body) to the rated capacity is preferable, but in the relation with the in-vehicle volume, the ratio of the battery area to the rated capacity is usually 1000 $cm^2/Ah$ or less. The ratio value of the battery area (the projected area of the battery including the battery outer casing body) to the rated capacity is preferably 5 to 15 $cm^2/Ah$.

In the non-aqueous electrolyte secondary battery according to this aspect, the rated capacity is 30 Ah or more. The case of a high-capacity battery in which the ratio value of the battery area (the projected area of the battery including the battery outer casing body) to the rated capacity is 4 $cm^2/Ah$ or more and the rated capacity is 30 Ah or more, it is further difficult to maintain a high capacity due to a repetition of the charge and discharge cycle, and thus a problem of improvement in cycle durability is further significantly exhibited. On the other hand, in the case of a battery, which does not have a large area and a large capacity as described above, such as a consumer battery of the related art, such a problem does not significantly occur (see Comparative Examples 4 to 6 described later). A larger rated capacity is preferable, and the upper limit thereof is not particularly limited, but is usually 100 Ah or less. The rated capacity is preferably 30 to 70 Ah and more preferably 40 to 60 Ah. Incidentally, as the rated capacity, a value measured by a method described in the following Examples is employed.

Further, regarding the physical size of the electrode, the length of the short side of a laminate cell battery is preferably 100 mm or more. Such a large-sized battery can be used for a vehicle. Herein, the length of the short side of the laminate cell battery indicates a side having the shortest length. The upper limit of the length of the short side is not particularly limited, but is usually 400 mm or less.

Further, the aspect ratio of a rectangular electrode is preferably 1 to 3 and more preferably 1 to 2. Incidentally, the aspect ratio of the electrode is defined as the length/width ratio of a positive electrode active material layer with a rectangular shape. When the aspect ratio is in this range, an advantage of having both the performance required for a vehicle and mounting space can be achieved.

[Assembled Battery]

An assembled battery is constituted by connecting a plurality of batteries. In detail, the assembled battery is constituted by connecting at least two or more batteries in series, in parallel, or in series and parallel. It is possible to freely control the capacity and voltage by connecting the batteries in series and in parallel.

It is also possible to form a detachable small-sized assembled battery by connecting plural batteries in series or in parallel. Moreover, by further connecting a plurality of detachable small-sized assembled batteries in series or parallel, it is possible to form an assembled battery having a high capacity and a high output which is suitable as a power source or an auxiliary power source for driving a vehicle requiring a high volume energy density and a high volume output density. The number of the connected batteries for producing an assembled battery or the number of the laminated small-sized assembled batteries for producing an assembled battery having a high capacity may be determined depending on the capacity or output of the battery that is mounted to a vehicle (electric vehicle).

A cell unit obtained by laminating a plurality of batteries in this way may be housed in upper and lower cases (for example, metal cases) to form an assembled battery. At this time, generally, the metal cases are fastened by a fastening member so that the assembled battery is accommodated in the cases. Therefore, the battery is pressurized in the laminating direction inside the cases. By such pressurization, in-plane pressure distribution easily occurs in a large-sized battery, but according to the configuration of this embodiment, it is considered that, since the variation in porosity in the positive electrode active material is small, electro-current constriction caused by pressure distribution can be alleviated.

[Vehicle]

The non-aqueous electrolyte secondary battery of this embodiment can maintain a discharge capacity even when being used for a long period of time and thus exhibits favorable cycle characteristics. Further, the volume energy density is high. For use in a vehicle such as an electric vehicle, a hybrid electric vehicle, a fuel cell electric vehicle, or a hybrid fuel cell electric vehicle, a long lifespan is required as well as a high capacity and a large size compared to use in an electric and mobile electronic device. Therefore, the non-aqueous electrolyte secondary battery can be suitably utilized as a power source for a vehicle, for example, as a power source or as an auxiliary power source for driving a vehicle.

Specifically, the battery or the assembled battery formed by combining a plurality of batteries can be mounted on a vehicle. In the present invention, a battery exhibiting excellent long term reliability, output characteristics, and a long lifespan can be formed, and thus, by mounting such a battery, a plug-in hybrid electric vehicle having a long EV driving distance and an electric vehicle having a long driving distance per one charge can be constituted. This is because a vehicle having a long lifespan and high reliability can be provided as the battery or an assembled battery formed by combining a plurality of batteries is used in, for example, a vehicle such as a hybrid car, a fuel cell electric car, or an electric car (including a two-wheel vehicle (motor bike) or a three-wheel vehicle in addition to all four-wheel vehicles (a passenger vehicle, a truck, a commercial vehicle such as a bus, a compact car, or the like)). However, the use is not limited to a vehicle, but the battery or the assembled battery can be applied to various kinds of power sources of other vehicles, for example, a moving object such as an electric train, and it can be also utilized as a built-in power source of an uninterruptable power source unit.

EXAMPLES

The effect of the present invention will be described by means of the following Examples and Comparative Examples. "Part(s)" or "%" in Examples represents "part(s) by weight" or "% by weight" unless otherwise specified. In addition, respective operations are performed at room temperature (25° C.) unless otherwise specified.

(Measurement Method of Variation in Porosity)

Hereinafter, the variation in porosity in each separator used in Examples and Comparative Examples was calculated by the following method.

Figure 2:
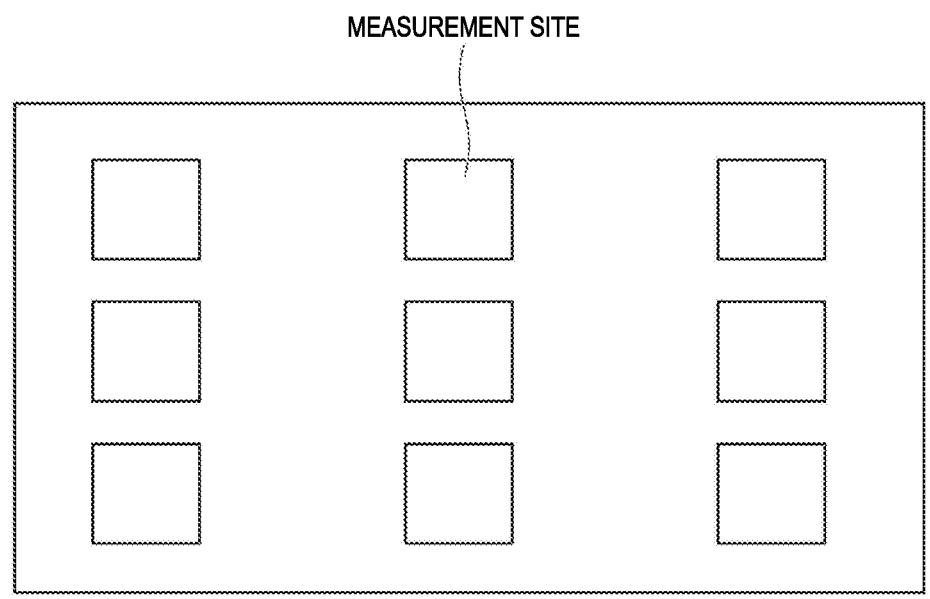
FIG. 2 is an explanatory diagram for describing a method of selecting nine measurement regions in a plane when a variation in porosity in a separator is calculated.

First, the porosity of nine measurement regions of 3 cm×3 cm selected in the plane direction of the separator as illustrated in FIG. 2 was measured, and then the maximum value and the minimum value among nine measurement values were regarded as "maximum porosity" and "minimum porosity", respectively. An arithmetic average of the nine measurement values was regarded as "average porosity"." Then, from these values, the variation in porosity was calculated according to the following equation.

$$\frac{(\text{Maximum porosity} - \text{Minimum porosity})}{\text{Average porosity}} \times 100 (\%) \qquad [\text{Math. 1}]$$

Incidentally, at the time of measuring the porosity in the sample of the separator, first, the volume of pores (micropores) existing in the sample was measured by a mercury intrusion method using a mercury intrusion porosimeter according to micropore distribution measurement. Then, the porosity of the separator sample was calculated from the measurement value of the pore volume and the apparent volume of the sample (porosity=sample pore volume/sample volume)×100(%)).

Example 1

1. Production of Electrolyte Solution A mixed solvent of ethylene carbonate (EC), ethylmethyl carbonate (EMC), and diethyl carbonate (DEC) (30:30:40 (volume ratio)) was used as a solvent. In addition, 1.0 M LiPF$_6$ was used as a lithium salt. Further, 2.0% by weight of vinylene carbonate with respect to the total 100% by weight of the solvent and the lithium salt was added to produce an electrolyte solution. Incidentally, "1.0 M LiPF$_6$" means 1.0 M concentration of the lithium salt (LiPF$_6$) in a mixture of the mixed solvent and the lithium salt.

2. Production of Positive Electrode

A solid content consisting of 90% by weight of LiNi$_{1/3}$Mn$_{1/3}$Co$_{1/3}$O$_2$ (average particle diameter: 15 μm) as a positive electrode active material, 5% by weight of acetylene black as a conductive aid, and 5% by weight of PVdF as a binder was prepared. To this solid content, an appropriate amount of N-methyl-2-pyrrolidone (NMP) as a slurry viscosity adjusting solvent was added to prepare a positive electrode active material slurry. Next, the positive electrode active material slurry was applied to both surfaces of an aluminum foil (thickness: 20 μm) as a current collector by using a coater and subjected to drying and pressing, to produce a positive electrode having a coating amount of the positive electrode active material layer on one surface of 15.0 mg/cm$^2$. In addition, the density of the positive electrode active material layer was set to 2.8 g/cc.

3. Production of Negative Electrode

A solid content consisting of 94% by weight of natural graphite (average particle diameter: 20 μm) as a negative electrode active material, 2% by weight of acetylene black as a conductive aid, and 3% by weight of SBR and 1% by weight of CMC as a binder were prepared. To this solid component, an appropriate amount of ion-exchanged water as a slurry viscosity adjusting solvent was added to prepare a negative electrode active material slurry. Next, the negative electrode active material slurry was applied to both surfaces of a copper foil (10 μm) as a current collector and subjected to drying and pressing, to produce a negative electrode having a coating amount on one surface of 7.3 mg/cm$^2$. In addition, the density of the negative electrode active material layer was set to 1.4 g/cc.

4. Completion Process of Single Battery

The positive electrode produced above was cut to a rectangular shape of 200×204 mm, and the negative electrode was cut to a rectangular shape of 205×209 mm (24 pieces of the positive electrode and 25 pieces of the negative electrode). These positive electrode and negative electrode were alternately laminated with a separator of 210×214 mm (polypropylene microporous membrane, thickness: 25 μm, porosity: 55%) interposed therebetween, thereby producing a power generating element. Incidentally, a value of the variation in porosity in the separator used herein was 1.2%.

The obtained power generating element was welded with a tab and sealed together with an electrolyte solution in an outer casing boy formed of an aluminum laminate film to complete a battery. Thereafter, the battery was inserted with a urethane rubber sheet (thickness: 3 mm) having a larger area than the area of the electrode, further the battery was sandwiched by Al plates (thickness: 5 mm), and the battery was appropriately pressed from both sides in the lamination direction. Then, the battery obtained in this way was subjected to initial charging over 5 hours (upper limit voltage: 4.15 V). Thereafter, aging for 5 days was performed at 45° C., and degassing and discharging were performed, thereby completing a battery of this Example. The rated capacity (cell capacity) of the battery produced in this way was 40 Ah, and the ratio value of the positive electrode area to the rated capacity was 10.2 cm$^2$/Ah.

Incidentally, the rated capacity of the battery was obtained by the following method.

«Measurement of Rated Capacity»

Procedure 1: After the voltage reaches 4.15 V at a constant current charge of 0.2 C, charge for 2.5 hours at a constant voltage charge, and then rest for 10 seconds.

Procedure 2: After the voltage reaches 3.0 V at a constant current discharge of 0.2 C, rest for 10 seconds.

Rated capacity: Discharge capacity in constant current discharge (CC discharge capacity) in the procedure 2 was regarded as the rated capacity.

Example 2

A battery was completed by the same method as in Example 1 described above, except that the coating amounts of the positive electrode active material layer and the negative electrode active material layer on one surface were changed to 18.0 mg/cm$^2$ and 8.8 mg/cm$^2$, respectively, and the sizes of the positive electrode, the negative electrode, and the separator were changed to 200×210 mm, 205×215 mm, and 210×220 mm, respectively.

Example 3

A battery was completed by the same method as in Example 2 described above, except that the coating amounts of the positive electrode active material layer and the negative electrode active material layer on one surface were changed to 21.5 mg/cm$^2$ and 10.5 mg/cm$^2$, respectively.

Example 4

A battery was completed by the same method as in Example 1 described above, except that a separator of 210×214 mm (polypropylene microporous membrane, thickness: 25 μm, porosity: 55%) having a value of the variation in porosity of 1.9% was used as the separator.

Example 5

A battery was completed by the same method as in Example 2 described above, except that a separator of 210×220 mm (polypropylene microporous membrane, thickness: 25 μm, porosity: 55%) having a value of the variation in porosity of 1.9% was used as the separator.

Example 6

A battery was completed by the same method as in Example 3 described above, except that a separator of 210×220 mm (polypropylene microporous membrane, thickness: 25 μm, porosity: 55%) having a value of the variation in porosity of 1.9% was used as the separator.

Example 7

A battery was completed by the same method as in Example 1 described above, except that a separator of 210×214 mm (polypropylene microporous membrane, thickness: 25 μm, porosity: 55%) having a value of the variation in porosity of 2.9% was used as the separator.

Example 8

A battery was completed by the same method as in Example 2 described above, except that a separator of 210×220 mm (polypropylene microporous membrane, thickness: 25 μm, porosity: 55%) having a value of the variation in porosity of 2.9% was used as the separator.

Example 9

A battery was completed by the same method as in Example 3 described above, except that a separator of 210×220 mm (polypropylene microporous membrane, thickness: 25 μm, porosity: 55%) having a value of the variation in porosity of 2.9% was used as the separator.

Example 10

A battery was completed by the same method as in Example 1 described above, except that a separator of 210×214 mm (polypropylene microporous membrane, thickness: 25 μm, porosity: 55%) having a value of the variation in porosity of 3.8% was used as the separator.

Example 11

A battery was completed by the same method as in Example 2 described above, except that a separator of 210×220 mm (polypropylene microporous membrane, thickness: 25 μm, porosity: 55%) having a value of the variation in porosity of 3.8% was used as the separator.

Example 12

A battery was completed by the same method as in Example 3 described above, except that a separator of 210×220 mm (polypropylene microporous membrane, thickness: 25 μm, porosity: 55%) having a value of the variation in porosity of 3.8% was used as the separator.

Comparative Example 1

A battery was completed by the same method as in Example 1 described above, except that a separator of 210×214 mm (polypropylene microporous membrane, thickness: 25 μm, porosity: 55%) having a value of the variation in porosity of 5.2% was used as the separator.

Comparative Example 2

A battery was completed by the same method as in Example 2 described above, except that a separator of 210×220 mm (polypropylene microporous membrane, thickness: 25 μm, porosity: 55%) having a value of the variation in porosity of 5.2% was used as the separator.

Comparative Example 3

A battery was completed by the same method as in Example 3 described above, except that a separator of 210×220 mm (polypropylene microporous membrane, thickness: 25 μm, porosity: 55%) having a value of the variation in porosity of 5.2% was used as the separator.

Comparative Example 4

The coating amounts of the positive electrode active material layer and the negative electrode active material layer on one surface were changed to 10.6 mg/cm$^2$ and 5.3 mg/cm$^2$, respectively. In addition, the sizes of the positive electrode and the negative electrode were changed to 200×179 mm and 205×184 mm, respectively. Further, a separator of 210×189 mm (polypropylene microporous membrane, thickness: 25 μm, porosity: 55%) having a value of the variation in porosity of 5.2% was used as the separator. A battery was completed by the same method as in Example 1 described above except the above-described conditions.

Comparative Example 5

The coating amounts of the positive electrode active material layer and the negative electrode active material layer on one surface were changed to 10.8 mg/cm$^2$ and 5.6 mg/cm$^2$, respectively. In addition, the sizes of the positive electrode and the negative electrode were changed to 200×226 mm and 205×231 mm, respectively. Further, a separator of 210×236 mm (polypropylene microporous membrane, thickness: 25 μm, porosity: 55%) having a value of the variation in porosity of 6.5% was used as the separator. A battery was completed by the same method as in Example 1 described above except the above-described conditions.

Comparative Example 6

The coating amounts of the positive electrode active material layer and the negative electrode active material layer on one surface were changed to 26.0 mg/cm$^2$ and 12.7 mg/cm$^2$, respectively. In addition, the sizes of the positive electrode and the negative electrode were changed to 80×132 mm and 85×137 mm, respectively. Further, 35 pieces of the positive electrode and 36 pieces of the negative electrode were alternately laminated with a separator so that the number of laminated layers of the battery was set to 35. Further, a separator of 90×142 mm (polypropylene microporous membrane, thickness: 25 μm, porosity: 55%) having a value of the variation in porosity of 6.5% was used as the separator. A battery was completed by the same method as in Example 1 described above except the above-described conditions.

(Cycle Characteristics)

The battery produced in each of Examples and Comparative Examples was charged to a cutoff voltage of 4.15 V with a current density of 2 mA/cm$^2$ for the positive electrode to have an initial charge capacity. Then, the capacity at the time of discharging to a cutoff voltage of 3.0 V after resting for 1 hour was used as an initial discharge capacity. This charge and discharge cycle was repeated 500 times. A ratio of the discharge capacity in the 500th cycle to the initial discharge capacity was regarded as a capacity retention rate (%) and evaluated as cycle durability.

Figure 4:
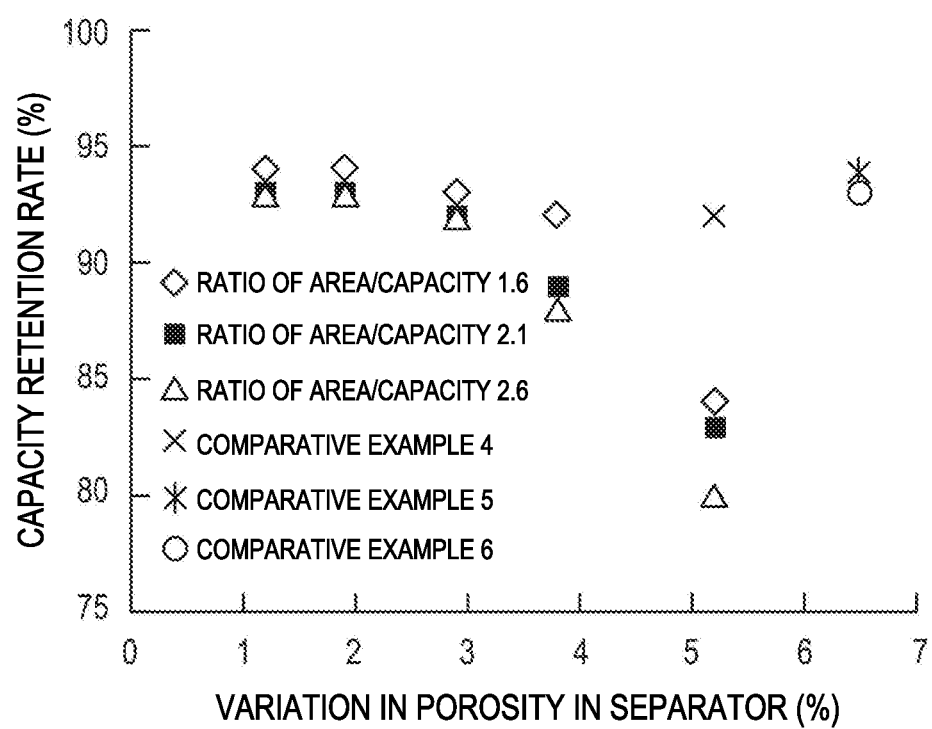
FIG. 4 is a graph obtained by plotting results obtained in Examples described later while a variation in porosity in the separator is plotted on a horizontal axis and a capacity retention rate (%) is plotted on a vertical axis.

The production conditions and the results of cycle characteristics of each of Examples and Comparative Examples are presented in the following Table 1. Further, a graph obtained by plotting the variation in porosity in the separator on a horizontal axis and plotting the capacity retention rate (%) on a vertical axis is shown in FIG. 4.

TABLE 1

| | Size of positive electrode (mm × mm) | Size of negative electrode (mm × mm) | Number of laminated layers | Weight per unit area of positive electrode (mg/cm²) | Density of positive electrode (g/cc) | Weight per unit area of negative electrode (mg/cm²) | Density of negative electrode (g/cc) | Ratio of rated capacity/pore volume of separator (Ah/cc) | Variation in porosity in separator (%) | Ratio of area/rated capacity (cm²/Ah) | Rated capacity (Ah) | Capacity retention rate (%) |
|---|---|---|---|---|---|---|---|---|---|---|---|---|
| Example 1 | 200 × 204 | 205 × 209 | 24 | 15 | 2.8 | 7.3 | 1.4 | 1.6 | 1.2 | 10.2 | 40 | 94 |
| Example 2 | 200 × 210 | 205 × 215 | 24 | 18 | 2.8 | 8.8 | 1.4 | 2.1 | 1.2 | 8.4 | 50 | 93 |
| Example 3 | 200 × 210 | 205 × 215 | 24 | 21.5 | 2.8 | 10.5 | 1.4 | 2.6 | 1.2 | 7.0 | 60 | 93 |
| Example 4 | 200 × 204 | 205 × 209 | 24 | 15 | 2.8 | 7.3 | 1.4 | 1.6 | 1.9 | 10.2 | 40 | 94 |
| Example 5 | 200 × 210 | 205 × 215 | 24 | 18 | 2.8 | 8.8 | 1.4 | 2.1 | 1.9 | 8.4 | 50 | 93 |
| Example 6 | 200 × 210 | 205 × 215 | 24 | 21.5 | 2.8 | 10.5 | 1.4 | 2.6 | 1.9 | 7.0 | 60 | 93 |
| Example 7 | 200 × 204 | 205 × 209 | 24 | 15 | 2.8 | 7.3 | 1.4 | 1.6 | 2.9 | 10.2 | 40 | 93 |
| Example 8 | 200 × 210 | 205 × 215 | 24 | 18 | 2.8 | 8.8 | 1.4 | 2.1 | 2.9 | 8.4 | 50 | 92 |
| Example 9 | 200 × 210 | 205 × 215 | 24 | 21.5 | 2.8 | 10.5 | 1.4 | 2.6 | 2.9 | 7.0 | 60 | 92 |
| Example 10 | 200 × 204 | 205 × 209 | 24 | 15 | 2.8 | 7.3 | 1.4 | 1.6 | 3.8 | 10.2 | 40 | 92 |
| Example 11 | 200 × 210 | 205 × 215 | 24 | 18 | 2.8 | 8.8 | 1.4 | 2.1 | 3.8 | 8.4 | 50 | 89 |
| Example 12 | 200 × 210 | 205 × 215 | 24 | 21.5 | 2.8 | 10.5 | 1.4 | 2.6 | 3.8 | 7.0 | 60 | 88 |
| Comparative Example 1 | 200 × 204 | 205 × 209 | 24 | 15 | 2.8 | 7.3 | 1.4 | 1.6 | 5.2 | 10.4 | 40 | 84 |
| Comparative Example 2 | 200 × 210 | 205 × 215 | 24 | 18 | 2.8 | 8.8 | 1.4 | 2.1 | 5.2 | 8.4 | 50 | 83 |
| Comparative Example 3 | 200 × 210 | 205 × 215 | 24 | 21.5 | 2.8 | 10.5 | 1.4 | 2.6 | 5.2 | 7.0 | 60 | 80 |
| Comparative Example 4 | 200 × 179 | 205 × 184 | 24 | 10.6 | 2.8 | 5.3 | 1.4 | 1.4 | 5.2 | 14.3 | 25 | 92 |
| Comparative Example 5 | 200 × 226 | 205 × 231 | 24 | 10.8 | 2.8 | 5.6 | 1.4 | 1.2 | 6.5 | 14.0 | 25 | 94 |
| Comparative Example 6 | 80 × 132 | 85 × 137 | 35 | 26 | 2.8 | 12.7 | 1.4 | 1.6 | 6.5 | 3.9 | 27 | 93 |

From the results presented in Table 1 described above, when Comparative Examples 1 to 3 are compared to Examples 1, 4, 7, and 10, Example 2, 5, 8, and 11, and Examples 3, 6, 9, and 12 which have the same ratio of the rated capacity to the pore volume of the separator, respectively, it is found that in a case where the ratio of the rated capacity to the pore volume of the separator is 1.55 Ah/cc or more, the cycle durability of the battery is significantly improved when the variation in porosity in the separator is 4.0% or less.

Further, when Examples are compared to one another, in Examples 1, 4, 7, and 10 in which the ratio of the rated capacity to the pore volume of the separator is relatively small (1.6 Ah/cc), a large difference in the value of the capacity retention rate was not recognized. On the other hand, when Examples 2, 5, 8, and 11 in which the ratio of the rated capacity to the pore volume of the separator is 2.1 are compared to one another, it is found that the capacity retention rate is further significantly improved when the variation in porosity in the separator is 3.0% or less. Similarly, when Examples 3, 6, 9, and 12 in which the ratio of the rated capacity to the pore volume of the separator is larger, that is, 2.6 are compared to one another, it is found that, when the variation in porosity in the separator is 3.0% or less, as was expected, the capacity retention rate is further significantly improved.

Incidentally, focusing on the value of the variation in porosity in the separator, in Examples 1 to 6 in which that value is 2.0% or less, an extremely high capacity retention rate of 93% or more is achieved in all cases.

On the other hand, in Comparative Examples 4 to 6, the variation in porosity in the separator was larger than 5%, but a decrease in capacity retention rate was not observed. The reason for this is considered that the ratio of the rated capacity to the pore volume of the separator is not so large in these Comparative Examples (the battery is not a high-capacity battery; Comparative Examples 4 and 5), the rated capacity itself is not so large (also, the battery is not a high-capacity battery; Comparative Examples 4 to 6), or the ratio of the battery area to the rated capacity is not so large (the battery is not a large-area battery; Comparative Example 6), whereby problems of electro-current constriction and local degradation caused thereby in a battery having a high capacity and a large area do not become evident. As described above, the present invention is triggered by the finding that there is a problem uniquely occurring in a battery having a high capacity and a large area. Further, in addition thereto, it can be said that the present invention is completed by the finding that the above-described problem can be prevented from occurring by controlling the variation in porosity of the separator to a predetermined value or less.

REFERENCE SIGNS LIST 10, 50 Lithium ion secondary battery
11 Negative electrode current collector
12 Positive electrode current collector
13 Negative electrode active material layer
15 Positive electrode active material layer
17 Separator
19 Single battery layer
21, 57 Power generating element
25 Negative electrode current collecting plate
27 Positive electrode current collecting plate
29, 52 Battery outer casing material
58 Positive electrode tab
59 Negative electrode tab

The invention claimed is:

1. A non-aqueous electrolyte secondary battery comprising a power generating element including
a positive electrode obtained by forming a positive electrode active material layer containing a positive electrode active material on a surface of a positive electrode current collector,
a negative electrode obtained by forming a negative electrode active material layer containing a negative electrode active material on a surface of a negative electrode current collector, and a separator comprising a porous sheet composed of a polyolefin or a hydrocarbon-based resin, a ratio of a rated capacity to a pore volume of the separator being 1.6 Ah/cc or more and 2.6 Ah/cc or less, a ratio of a battery area to a rated capacity being 7.0 cm$^2$/Ah or more and 10.2 cm$^2$/Ah or less, and a rated capacity being 40 Ah or more and 60 Ah or less, wherein a variation in porosity in the separator is 1.2% or more and 3.8% or less.

2. The non-aqueous electrolyte secondary battery according to claim 1, wherein the variation in porosity in the separator is 1.2% or more and 2.9% or less.

3. The non-aqueous electrolyte secondary battery according to claim 1, wherein the variation in porosity in the separator is 1.2% or more and 1.9% or less.

4. The non-aqueous electrolyte secondary battery according to claim 1, wherein the positive electrode active material is a lithium composite oxide having a composition represented by General Formula (1): $Li_aNi_bMn_cCo_dM_xO_2$ (provided that, in the formula, a, b, c, d, and x satisfy $0.9 \leq a \leq 1.2$, $0 < b < 1$, $0 < c \leq 0.5$, $0 < d \leq 0.5$, and $0 \leq x \leq 0.3$; and M is at least one element selected from Ti, Zr, Nb, W, P, Al, Mg, V, Ca, Sr, and Cr).

5. The non-aqueous electrolyte secondary battery according to claim 1, wherein the non-aqueous electrolyte secondary battery is a flat stack type laminate battery obtained by sealing the power generating element in a battery outer casing body formed of a laminate film containing aluminum.

* * * * *